United States Patent [19]

Mott et al.

[11] Patent Number: 5,393,982

[45] Date of Patent: Feb. 28, 1995

[54] HIGHLY SENSITIVE NUCLEAR SPECTROMETER APPARATUS AND METHOD

[75] Inventors: Richard B. Mott, Ringoes, N.J.; Charles G. Waldman, Allston, Mass.; Daniel E. Ungar, Blauvelt, N.Y.

[73] Assignee: Princeton Gamma Tech, Inc., Princeton, N.J.

[21] Appl. No.: 246,695

[22] Filed: May 20, 1994

Related U.S. Application Data

[63] Continuation of Ser. No. 64,859, May 20, 1993.

[51] Int. Cl.$^6$ ............................................. G01T 1/36
[52] U.S. Cl. ............................ 250/370.06; 250/369; 364/498
[58] Field of Search .................. 250/370.06, 369; 364/498

[56] References Cited

U.S. PATENT DOCUMENTS

| | | | |
|---|---|---|---|
| 4,455,616 | 6/1984 | Inhar | 364/527 |
| 4,658,216 | 4/1987 | Goulding et al. | 328/109 |
| 5,036,539 | 7/1991 | Wrench, Jr. et al. | 381/43 |

Primary Examiner—Paul M. Dzierzynski
Assistant Examiner—David Vernon Bruce
Attorney, Agent, or Firm—Mathews, Woodbridge & Collins

[57] ABSTRACT

A nuclear spectrometer employs asymmetrical weighting functions to optimize energy resolution and throughput. Photons striking a semi-conductor detector generate current which is amplified, converted to a voltage step, and fed to a fast analog-to-digital converter (ADC) for pile-up rejection and a slow ADC whose output is examined for low-energy pile-up, slope corrected, and buffered for photon energy measurement. Pile-up is detected with a unique pair of leading and trailing weighting functions whose outputs have sharp rising and falling edges respectively, nearly independent of photon energy. Digital triangular shaping is used to locate the step in the buffer. Asymmetry of the triangular response is used to reject very low-energy pile-up. The step is also rejected if the average noise nearby exceeds a threshold. When a valid step is located, the buffered data stream surrounding the step is multiplied by an asymmetrical pair of leading and trailing weighting functions whose integrals are equal, though their widths and shapes vary depending on the time intervals to the preceding and following steps. The leading weighting function has a cusp shape that comes to a peak at the gap surrounding the step. The trailing function has its peak shifted slightly away from the gap by multiplying the cusp shape by a rising exponential $K(1-e^{-nt})$. A multi-channel analyzer attached to the weighting function circuit bins the measured photon energies to accumulate a spectrum.

4 Claims, 15 Drawing Sheets

FWHM vs. FILTER HALF-WIDTH

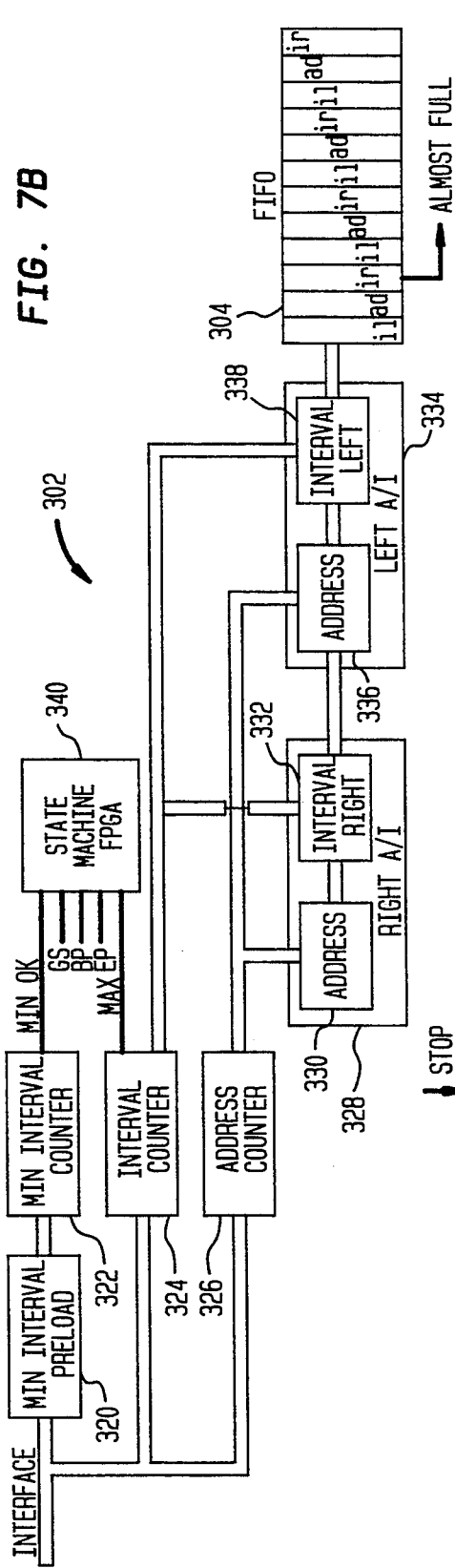
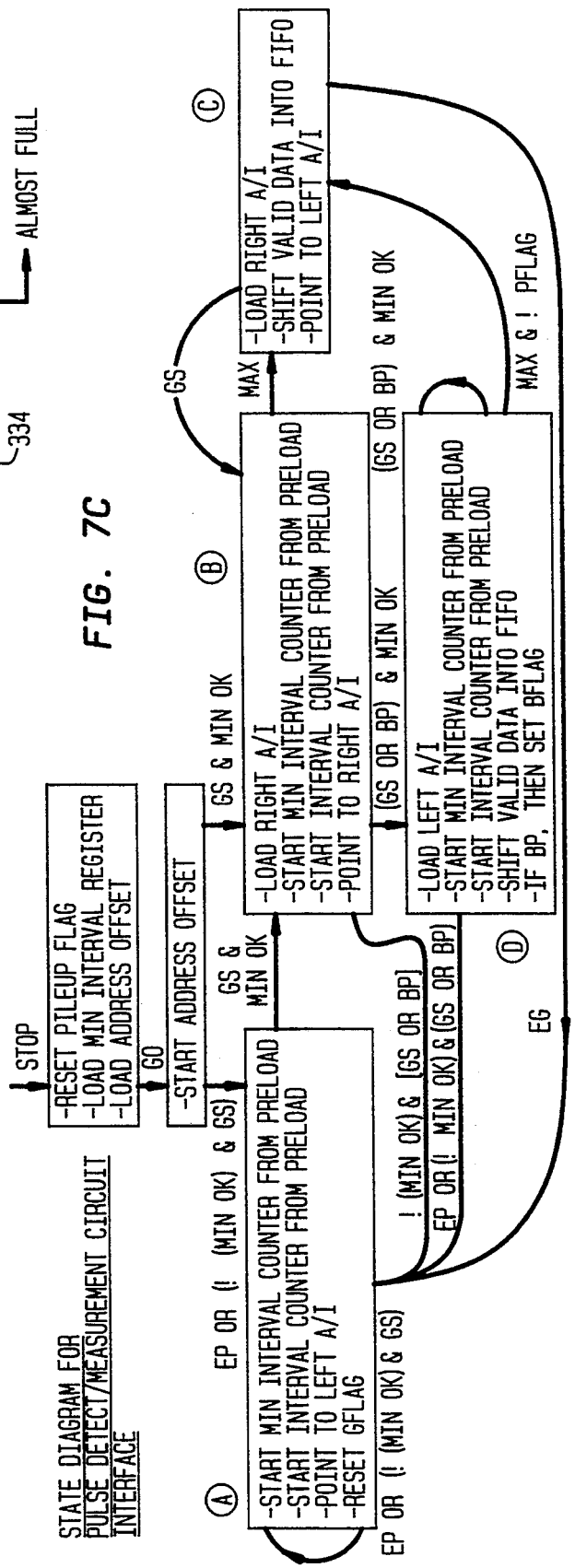
FIG. 7B
FIG. 7C
STATE DIAGRAM FOR
PULSE DETECT/MEASUREMENT CIRCUIT
INTERFACE

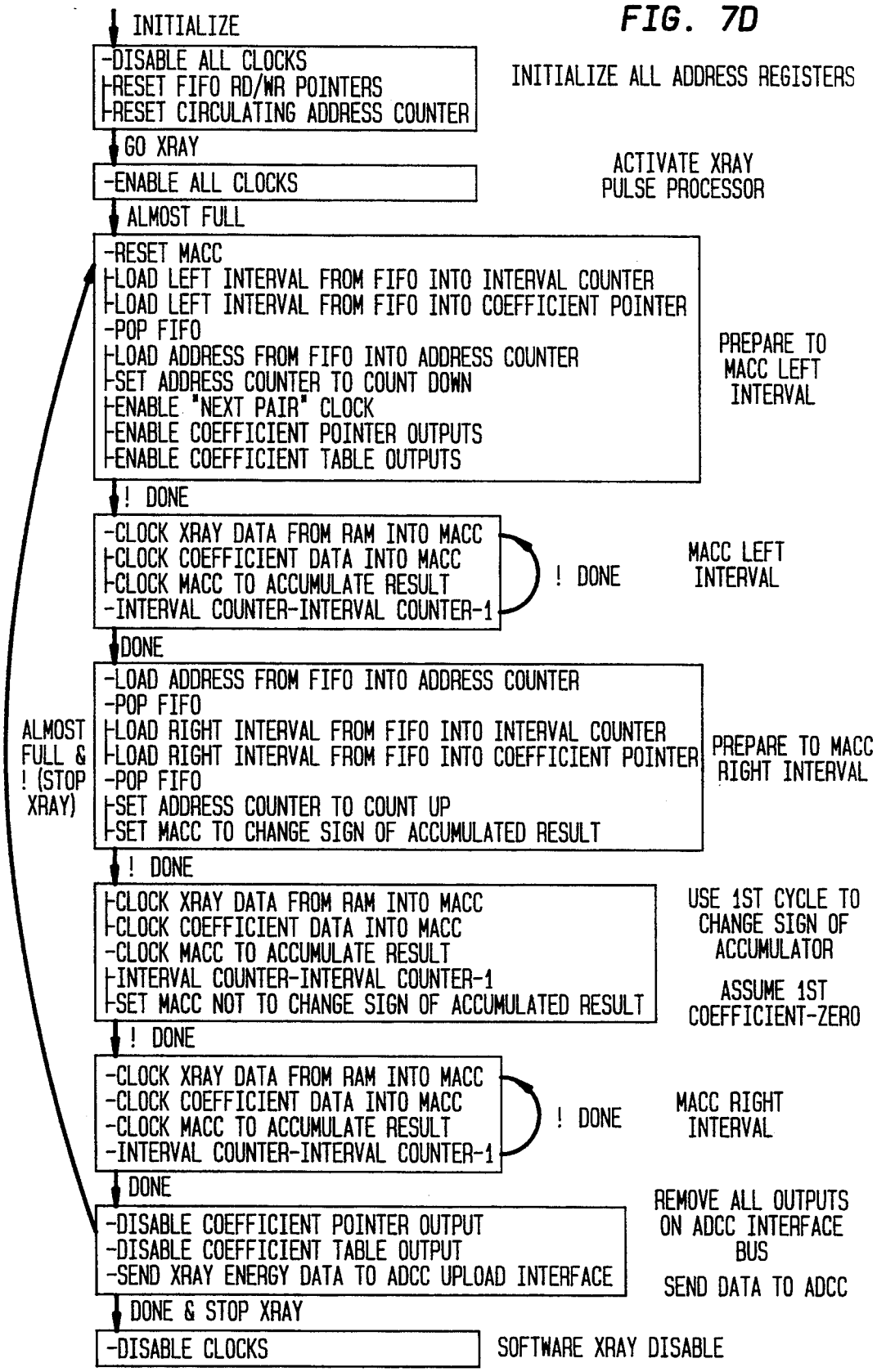

HIGHLY SENSITIVE NUCLEAR SPECTROMETER APPARATUS AND METHOD

This application is a continuation of application No. 08/064,859, filed May 20, 1993, which is still pending.

BACKGROUND OF THE INVENTION

1. Field of the Invention

The invention generally relates to a nuclear spectrometer apparatus and method and, in particular, to a nuclear spectrometer that employs unique asymmetrical weighting functions to obtain good energy resolution at high count rates and has especially accurate pulse pile-up detection which is sensitive to the presence of very low energy photon events.

2. Description of Related Art

Photon emission spectra at both X-ray and gamma-ray energies are frequently used in analyzing the elemental composition of materials. Such spectra are generated by measuring the energies of a great number of emitted photons and plotting the number of photons detected against the measured energy. Emission lines characteristic of chemical elements or isotopes appear as peaks in the resulting histogram, and the pattern and heights of these peaks can be used to determine the composition.

One measure of the quality of a nuclear spectrometer system is its energy resolution, which is the degree of spreading of an emission line into a peak of finite width. The lower the width, the better the resolution. At X-ray energies, since the width varies with energy, it is common in the art to specify energy resolution as the width of a particular emission line such as the Mn K-alpha line. Resolution is typically expressed in the art as the so-called Full Width at Half Maximum (FWHM), or the distance in energy between the two points halfway down the peak on either side. Longer pulse shaping times result in improved energy resolution, down to a minimum, or best, resolution determined by the noise characteristics of the detector and preamplifier.

Another figure of merit for a system is throughput, or the number of photons measured per second, which varies with both the incident rate of photon arrival and the pulse shaping time of the spectrometer.

Since photons arrive randomly in time based on Poisson statistics, it is possible for two photons to appear separated by an arbitrarily small time interval. The ability to distinguish between a single photon and two photons arriving close together is known in the art as "pile-up rejection."

A good general description of the prior art for measuring the energies of X-ray photons may be found on pages 296–309 of the book entitled Scanning Electron Microscopy and X-Ray Microanalysis, 2nd edition, by Goldstein, et al. In particular, Goldstein describes the pulse shaping of signals from a semi-conductor detector and preamplifier, and the relationships among shaping times, energy resolution, and pulse pile-up detection.

The traditional technique for prior art pile-up detection is to use one or more short time constant pulse shapers and rely on multiple threshold crossings of the outputs of the "fast channel" shapers with short time constants to detect the occurrence of multiple photons. This has the disadvantage that all conventional pulse shaping begins with differentiating the signal, which accentuates noise, followed by one or more integrations to smooth away the noise. It follows that shorter shaping times have more noise, and thus must have higher thresholds to avoid false triggering due to noise.

Further details of the various known methods of analog pulse shaping in nuclear spectrometers are given by Knoll's book Radiation Detection and Measurement on pages 572–582, and the noise performance of various possible shaping methods is discussed on pages 607–609. Note that the optimum pulse shape for energy resolution is the finite cusp, which is difficult to achieve with analog circuitry.

E. Gatti's and M. Sampietro's paper "Optimum Filters for Detector Charge Measurements in Presence of 1/f Noise," published in Nuclear Instruments and Methods in Physics Research A287 (1990), pp. 513–520, gives a complete theoretical treatment of the noise sources (series and parallel white noise and 1/f noise) for semiconductor photon detectors of the type used in the present invention. Gatti, et al. provides a set of relationships from which an optimum weighting function may be calculated from the noise properties of a semiconductor detector-and preamplifier for both an infinite measurement span and the practical case of a given finite processing interval.

The time-domain weighting function appropriate for use when both parallel white noise and 1/f noise are present (the normal case in a real detector) is described in Gatti, et al.'s paper, using the highest level of 1/f noise discussed in the paper for contrast with a curve of zero 1/f noise. Optimum weighting functions for a real detector fall between the two.

All derivations from classical filter theory which are based on frequency domain noise spectra and signal-to-noise considerations, like Gatti, et al.'s result in time-domain weighting functions which are symmetrical on either side of the photon event and of opposite sign.

U.S. Pat. No. 3,872,287 to Henriecus Koeman describes the application of a symmetrical weighting function to a series of short integrations of the output signal from a detector and preamplifier for equal time periods on either side of a photon step. The Koeman reference also allows the periods to differ from photon to photon, and for the weights to be greater close to the photon step, but always performs his integrations for an equal time period preceding and following each photon step. Since the intervals between photons are generally unequal, this means that some of the integrated samples in the longer interval are not used.

U.S. Pat. No. 5,005,146 to Tamáas Lakatos, et al. describes a very similar system which also relies on symmetric weighting functions and equal time intervals on either side of the photon step. Again, the restriction to equal time intervals necessitates discarding information from the wider interval.

The total error in measuring the height of a step in a noisy signal is the sum of the errors in measuring the signal before and after the step. In statistical terms, the variance of the difference is the sum of the variances of the measurement of the signal level on each side. If more samples can be used on one side of the step, the variance there will be smaller and thus the total variance of the difference will be smaller, improving the accuracy of the energy measurement and improving the resolution as a result. The present invention advantageously relaxes the restriction to equal time periods and symmetric weighting functions in favor of equal areas of the positive and negative sides of the weighting functions, regardless of their width and shape.

The Koeman, et al. patent also discusses the problem of leakage current causing a rising slope in the data stream, leading to an overestimate of the measured energy of a photon step. The remedy described in the Koeman et al. patent is to periodically trigger a measurement when no photon is present and subtract the result from the measured energies. This has two flaws. First, the period over which the zero point is estimated is no longer than the period over which a photon is measured, so random noise causes significant errors in the zero-point estimate. Second, the slope is assumed to be constant. While leakage current may be relatively constant, other sources of apparent slope may vary periodically, such as so-called "microphonics" (low-frequency resonances). The present invention constantly monitors the slope during all times when a step is not detected, averaging over a long period relative to the time of a photon measurement, and dynamically subtracts the average local slope out of the data stream so that the weighting function is applied to a slope-free signal.

U.S. Pat. No. 4,692,626 to Georg P. Westphal discloses a method of measuring the height of a photon step edge which relies on pre-loading the level of the preamplifier output signal prior to the step edge into an accumulator, and then continuously averaging the difference between the samples after the step and that pre-loaded level until the arrival of the next photon. While this technique makes use of all available samples, it does not permit the use of an optimum weighting function for both sides of the photon step. In particular, for the optimum weighting function, a sample will be weighted differently when used to measure the preceding photon than when used to measure the following photon, in order to give higher weight to samples nearer to the photon being measured. The present invention, however, does accomplish this.

The Westphal patent also discusses correction for slope due to leakage current, using the method of differentiating the signal to remove the slowly-varying slope and then subsequently integrating the signal from a zero baseline to generate replicas of the original step with zero slope.

Neither the method of Koeman, et al. nor the method of Westphal compensates well for periodically varying signals such as those produced by microphonic coupling, since they both estimate the correcting signal only from the part of the preamplifier output preceding the photon step. The present invention, by use of appropriate delays, estimates the local slope using a region of the preamplifier output surrounding the photon step and much wider than the processing period of a photon step, thus correcting for both constant and periodically varying slope.

U.S. Pat. No. 5,067,090 to Bronislaw Seeman discloses the use of conventional pulse shaping with a fixed time constant to form the photon step into a roughly Gaussian pulse, followed by fast digitization of the output of the pulse shaping to integrate the area of the pulse. A linear estimate of the baseline of the output of the pulse shaper is made by considering the sample before and after the beginning and end of the pulse, respectively. It is more advantageous to perform the pulse shaping digitally after converting a preamplifier output to digitized form, as is done in the present invention, securing the benefits of optimum filter shaping and pulse-to-pulse variable shaping times for the best combination of resolution and throughput.

Prior art pile-up detection is generally accomplished by using two or more conventional pulse shapers with differing time constants, a very short time constant for good time resolution, but poor energy resolution, and one or more longer time constants for better energy resolution. U.S. Pat. No. 4,152,596 to J. Howard Marshall, III discusses the use of a multiple time-constant approach at gamma-ray photon energies. Three ways of detecting pile-up are disclosed. First, multiple thresholds are used with the fast pulse to increase the chances that two pile-up pulses will produce multiple positive threshold crossings. This will not work unless the two photons are separated by more than the rise time of the fast pulse shaping, so, at best, the pulse-pair rejection timing is improved by about half. Second, the pulse width of the fast channel shaper may be tested against a maximum. Unfortunately, this width varies with energy, and the uncertainty in the width is most severe near the lowest energies distinguishable from noise at the short time constant of the fast channel, where small errors in energy will result in substantial changes in pulse width. Third, the energy from both the fast and slow channels can be measured and tested for equality. If they differ substantially, pile-up may be inferred. This method cannot handle photons too low in energy to be detected at all by the fast channel.

The paper "Optimizing Pulse Pileup Detection for Soft-X-Ray Spectroscopy," written by Alan J. Greenberger and published in Nuclear Instruments and Methods 188 (1981), pp. 125-132, describes a method for detecting pile-up for X-ray energies below 1 KeV. The technique is quite complex, requiring a great deal of circuitry and involving a chi-squared computation which requires an adaptive threshold based on energy to prevent large photons from rejecting themselves. Thus, the pile-up of two low-energy photons is adequately detected, but pile-up of a low-energy photon with a high-energy photon is not. The present invention detects the pile-up of very low energy photons with other such low-energy photons or with higher energy photons, using simple timing relationships to measure the symmetry of the output of a triangle-shaped pulse.

U.S. Pat. No. 4,684,989 to Barbara J. Roeder et al. describes a method for estimating the noise level of a signal having periodic redundant intervals, such as identical pixel locations in the successive frames of the signal from a video camera. In the present invention, there are no predictable redundant intervals due to the random nature of the arrival of photon events, but an estimate of noise level can still be made advantageously by realizing that the interesting parts of the signal are always positive-going steps, and also that the noise is positive-going and negative-going with equal probability. Thus, computing a running sum of only the negative differences between samples separated by a short period of time will yield a reasonable estimate of the local noise level in the signal while automatically ignoring the positive differences caused by photon step edges.

It was in the context of the foregoing prior art that the present invention arose.

SUMMARY OF THE INVENTION

Briefly described, the invention comprises a nuclear spectrometer instrument and method for analyzing the composition of a substance which emits photons. The photons initially deposit their energy in a reverse-biased semi-conductor detector. The current pulse in the detector is amplified, converted to a voltage step, and digitized by a pair of analog-to-digital converters. The output of one A/D converter is stored in a buffer for subsequent analysis. The output of the other A/D converter is analyzed in a fast channel pile-up detector which blanks the output of the instrument whenever a pile-up is located. The fast channel pile-up detector employs a unique pair of leading and trailing weighting functions whose responses have sharp leading and trailing edges, respectively, to accurately sense pile-ups. A peak detector connected to the fast channel pile-up detector and the data stream from the first A/D converter locates each photon event in the data stream and senses pile-up of photons too low in energy to trigger the fast channel pile-up detector.

Microphonics error is detected from the output of a triangle shaper used to locate photon events. That information is employed to remove the microphonics error from the stream of data before it enters the storage means. Any rising slope in the data stream due to leakage current is likewise detected and removed.

At low count rates where further increases in weighting function width are no longer effective in improving resolution, a noise level estimator is used to reject photons from regions of the data stream with higher than average noise.

Whenever a measurable single photon event is detected, the data stream stored in the buffer is multiplied by an asymmetrical pair of leading and trailing weighting functions surrounding the photon event. The width of the leading and trailing weighting functions are generally different but both have equivalent integrals. The leading weighting function is the negative left half of a relatively sharp cusp that comes to a peak adjacent to the gap between it and the trailing weighting function. The trailing weighting function, however, has a peak that is set back from the gap and has the general shape of the positive right half of a cusp multiplied by $K(1-e^{-nt})$, where K is a scale factor, t is distance in time from the photon event and n is a constant chosen to shift the peak of the weighting function 1–2 microseconds.

A conventional output analyzer attached to the weighting function circuit records and displays the spectrum derived from the energies of the photons. The instrument and method is capable of detecting relatively low energy photon events with a high degree of accuracy and reliability.

These and other features of the invention may be more fully understood by reference to the following drawings.

BRIEF DESCRIPTION OF THE DRAWINGS

FIG. 7B is a signal flow diagram illustrating the processing of data in the pulse detect timing logic circuit illustrated in FIG. 7A.

FIG. 7C and FIG. 7D are state diagrams illustrating the logical steps associated with the signals processed in the signal flow diagrams shown in FIG. 7A and FIG. 7B.

DETAILED DESCRIPTION OF THE PREFERRED EMBODIMENT

During the course of this description, like numbers will be used to identify like elements according to the different figures that illustrate the invention.

Figure 1:
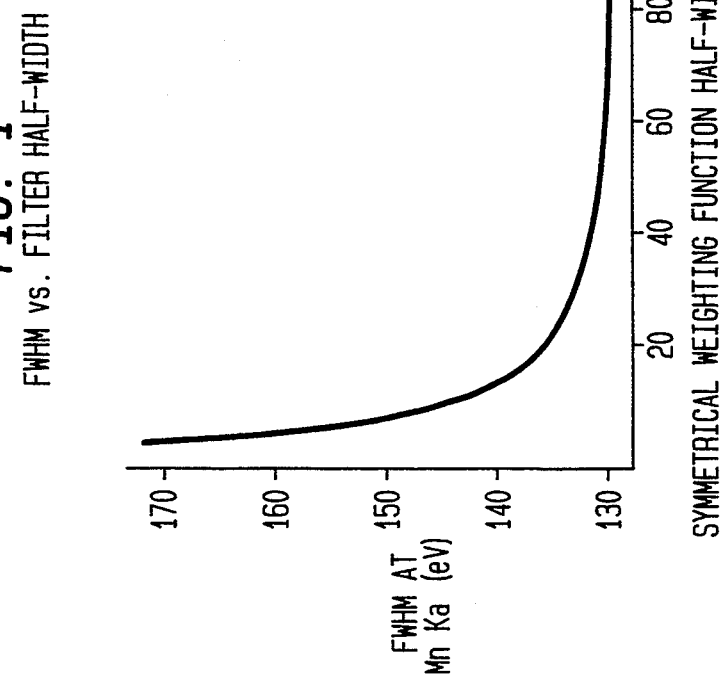
FIG. 1 illustrates the relationship between FWHM versus filter half-width and indicates the desirability of asymmetrical processing times between photon events.

FIG. 1 shows an important relationship in order to understand the desirability of asymmetric processing times between photon events. Peak resolution is shown on the vertical axis, expressed in full peak width at half the maximum peak height (FWHM) of the Mn K-alpha emission line as is common in the art. Lower resolution means better performance. The horizontal axis represents the processing time in microseconds on either side of the photon event for a symmetrical digital weighting function of fixed width.

The interval between the arrival of successive photons is a random variable following Poisson statistics, and, in general, the intervals preceding and following any given photon event will not be equal. If the processing time is constrained to be the same preceding and following the given photon event, it must be made less than or equal to the shorter of the two intervals in order to avoid errors in the measured energy of the photon. Yet, according to FIG. 1, the resolution of the system degrades very rapidly at short processing times (corresponding to high throughput). Higher throughput is desirable in order to get the best possible statistical precision for the peaks of the spectrum in the shortest possible time.

Throughput is defined as the number of photons successfully measured per second. This is related to the incident count rate and the minimum acceptable interval chosen. Using digital filtering, a photon will only be successfully measured if both the preceding and following intervals exceed the minimum interval. For a given incident count rate, a smaller minimum interval will result in a larger fraction of photons successfully measured, but poorer resolution. Thus, it is possible to trade off resolution versus throughput performance.

Successive intervals are independent, so the probability that both the preceding and following intervals are larger than any chosen minimum interval is the square of the probability that either one exceeds the minimum. This probability is $e^{-nt}$, and the square is therefore $e^{-2nt}$ where n is the incident count rate and t is the minimum interval. These expressions are familiar to those skilled in the art, due to the exponential nature of Poisson statistics.

The median interval m, such that half the intervals are longer than m and half are shorter, can be found for any incident photon arrival rate n by setting the probability $e^{-nm}$ equal to 0.5 and solving for m. Using the fixed processing times of prior art, it was common to compromise between resolution and throughput at moderate to high incident count rates from 10,000 to 100,000 photons/second by setting the minimum interval such that roughly 50% of the photons were measured successfully, i.e., setting t such that $e^{-2nt}=0.5$. Therefore, the median interval m is twice the minimum interval t required to obtain 50% throughput, so if an interval just meets the minimum requirement, its neighboring intervals are likely to be about twice as long.

The resolution of asymmetrical digital filter weighting functions was tested. The result is approximately the average of the resolutions obtained by using symmetric weighting functions with widths equal to each width of the asymmetric one. Except at extremely low count rates, an asymmetric filter will perform better than a symmetric filter which must be equal to or less than the shorter interval. The improvement is greater with increasing count rate, and higher count rates are preferable as described above.

Figure 2:
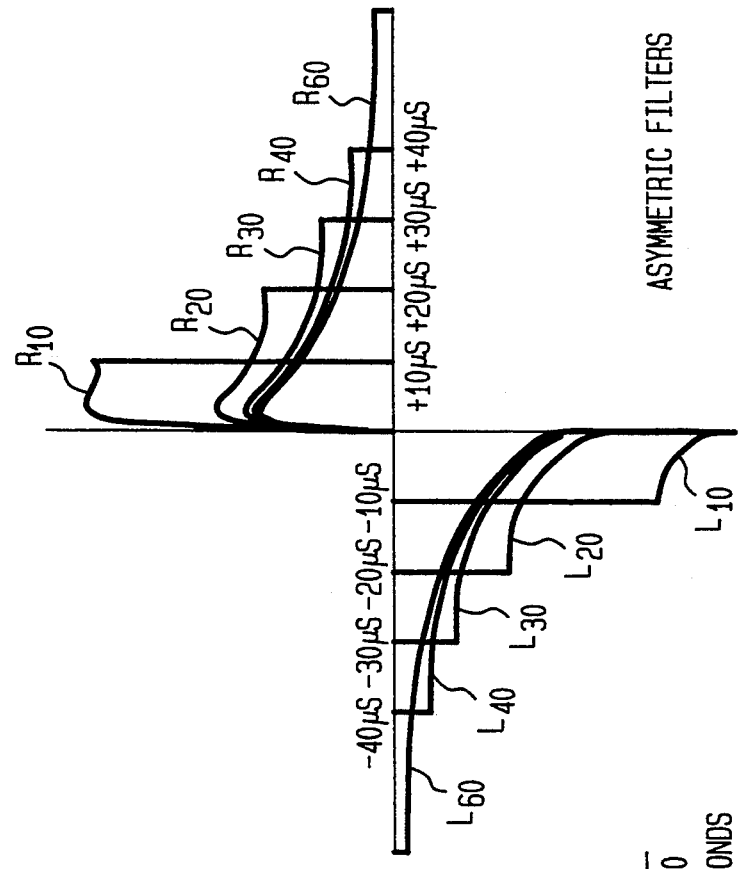
FIG. 2 illustrates a representative sample of possible asymmetrical digital filter weighting functions according to the preferred embodiment of the invention.

FIG. 2 shows a representative sample of asymmetrical digital filter weighting functions.

The weighting functions consist of sequences of numbers corresponding to each digitized sample of the preamplifier signal in the vicinity of a photon event. The shapes shown in FIG. 2 are the envelopes of these number sequences. The output of the digital filter, which is proportional to the energy of the photon, is computed by aligning the zero crossing in the middle of the weighting function with the center of the rising photon step, multiplying each number in the weighting function by the digitized preamplifier signal sample corresponding to it in time, and summing the results of all the multiplications. All the weights to the left of (before) the photon event are negative, and all the weights to the right of (after) the photon event are positive.

The critical equality in the weighting functions is the area of the right and left halves of the weighting function which, in a digital system, is equal to the sum of the weights in the lobes of FIG. 2 labelled L60, L40, L30, L20, L10, R10, R20, etc. Each of these areas is equal in magnitude, while the left and right halves are opposite in sign, so the sum of the weights is zero for any particular pair of left and right lobes. This is critical so that the results have no dependency on the average level of the preamplifier output.

As long as the magnitudes of the areas of the left and right lobes of all the weighting functions are equal, their widths and shapes can vary widely without inducing any systematic error in the measured photon energy.

The referenced paper by Gatti, et al. describes the computation of the optimum shape for a symmetric weighting function for a given detector and preamplifier's noise characteristics and for any choice of finite filter width. The weights chosen for the left lobe (just before the photon event) are generated using this computation. A small gap of zero weight separates the left and right lobes and is used to eliminate the samples of the preamplifier signal which are acquired while the signal is rising rapidly. Since there is no synchronization between the arrival time of the photon and the sampling rate of the signal, these samples have no predictable relationship to the weighting function and are best left out. The size of this gap will depend on the rise time of the preamplifier and the sampling rate. In the preferred embodiment, the optimum gap ranges from 1 to 5 samples.

The right lobe of the weighting function is modified slightly from the Gatti formulation. The preamplifier circuit makes a tradeoff between faster rise time and overshoot/ringing on the trailing edge of the response, and there is some residual overshoot. Empirically, it was determined that the photon energy is measured more accurately if the right lobe is multiplied by a rising exponential function $1-e^{-kt}$ with a time constant corresponding to the decay time of the overshoot envelope, such that the maximum weight occurs slightly later (1 to 3 microseconds, depending on the particular preamplifier) than in the strict Gatti formula. The entire right lobe is then scaled up to maintain the desired area.

While FIG. 2 only shows a few widths for clarity, the preferred embodiment is able to measure all intervals from 1 to 100 microseconds in width. In fact, a very large family of curves would fill in the entire horizontal scale of FIG. 2.

Figure 3:
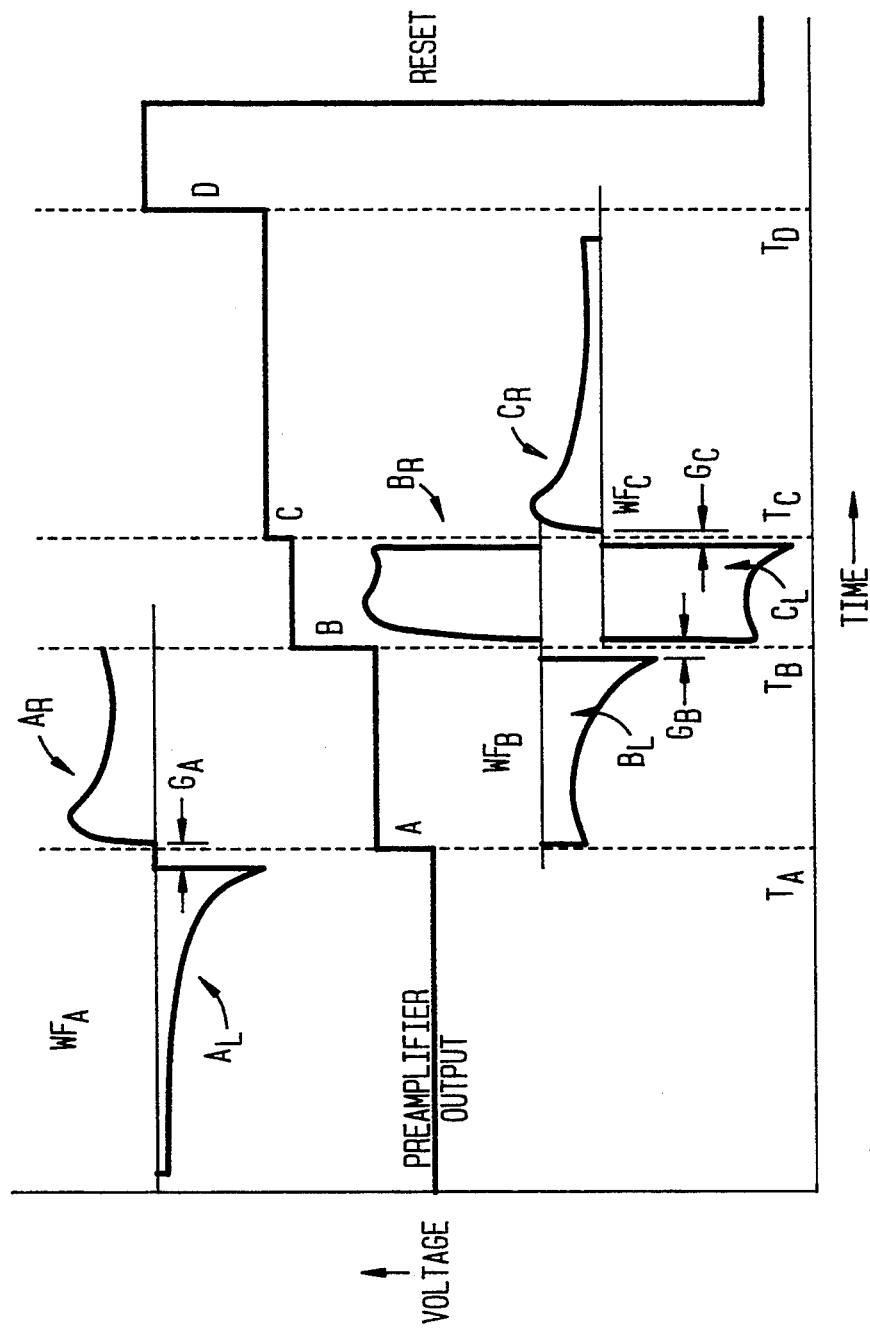
FIG. 3 illustrates the relationship between asymmetrical weighting functions according to the preferred embodiment of the invention with respect to the idealized noise-free output of a charge-sensitive preamplifier.

FIG. 3 shows the relationship between the asymmetrical weighting functions and the idealized noise-free output of a charge-sensitive preamplifier, shown in the center of the figure. There are four photon events shown, with varying step heights and with varying time intervals between them, labelled A, B, C, and D. The digital filter weighting functions to be applied to each of the first three pulses are shown aligned in time such that the transition from negative to positive weights is centered on the photon event. Such weighting functions cannot be generated by analog methods; they are asymmetrical in both width and shape on either side of the event.

The left and right lobes AL, AR, BL, BR, CL, and CR are chosen from the family of curves in FIG. 2. The center gaps GA, GB, and GC are greatly exaggerated for clarity. All possible data samples are being used to generate the best possible estimate of the photon energies. Note also that each data sample is used twice, with a different weight factor each time. This is because it is desirable for samples near the photon to be measured to have higher weighting factors than samples farther away due to 1/f noise, as is well know in the art and fully explained by Gatti, et al. No prior art filtering scheme satisfies both these constraints.

Figure 4:
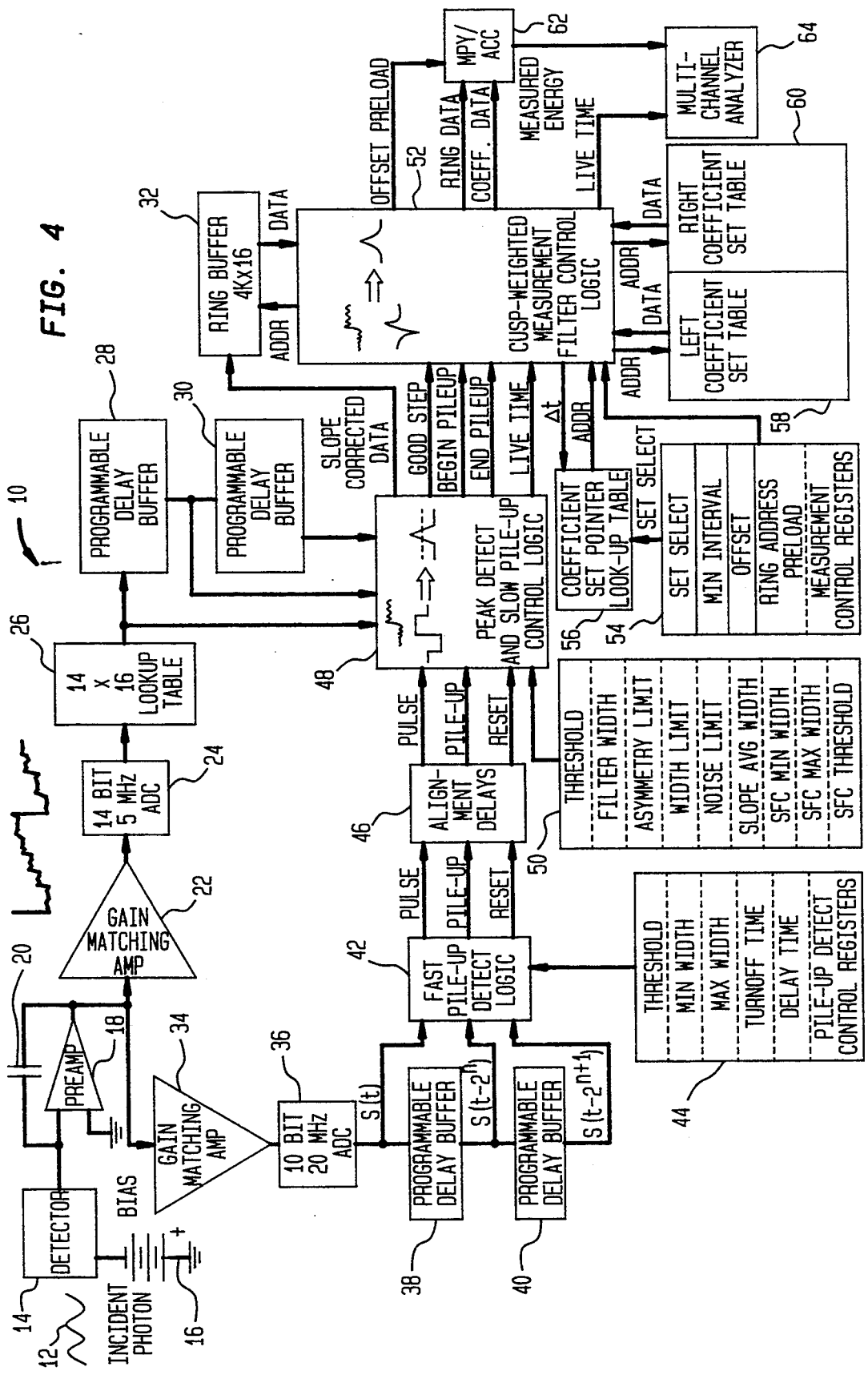
FIG. 4 is a schematic illustration of the overall preferred embodiment showing the basic elements of the invention and the general data flow through the system.

In order to generate the desired asymmetric weighting functions, center them correctly on the photon steps, and detect pile-up by successive photon events too close together to measure with the desired accuracy, the circuitry 10 shown in FIG. 4 is used. FIG. 4 represents a complete overview of the invention, showing the flow of data through the system. The logic blocks 42, 48, and 52 in FIG. 4 will be discussed first in terms of their general function and then in terms of their detailed operation.

Incident photons 12 strike semi-conductor detector 14, which is reverse biased by the high-voltage DC supply 16. These photons generate electron-hole pairs which are collected as a current signal and then converted to a voltage signal by the virtual-ground charge-to-voltage preamplifier 18 which accumulates the collected charge in capacitor 20. The resulting voltage signal is split through two buffer amplifiers 22 and 34 which provide input gain and impedance matching for two analog-to-digital converters (ADCs) 24 and 36. The fast-channel ADC 36 is a high-speed device (20 Mhz conversion rate) with relatively poor bit resolution (10 bits) which can therefore only detect photon events of energies above 500 eV. The measurement channel ADC 24 is a very high bit resolution device (14 bits) with a lower conversion rate (5 Mhz).

The purpose of having two converters is that the timing resolution for pile-up detection is limited by the conversion rate. Events occurring within a single ADC sample cannot be resolved. Higher precision conversion is required for accurate energy measurement, but is always slower. The specific conversion rates and bit precisions given here are not to be construed as limits on the invention. As ADC technology improves, conversion rates and bit precision for both the fast ADC 36 and measurement ADC 24 can be improved without changing the method used to analyze the resulting data streams.

The 14-bit data stream emerging from the measurement channel ADC 24 goes through a non-linearity correcting lookup table 26. This lookup table corrects for any non-linearity errors in the preamplifier 18 to an accuracy of $\frac{1}{2}$ of a least significant bit (LSB), widening the data from 14 to 16 bits.

The data then goes through two programmable delay buffers 28 and 30, generating three samples separated in time by a user selectable delay. The peak detect and slow pile-up control logic 48 uses these three samples to perform triangular pulse shaping on the data stream for the purpose of locating the sample which best represents the center of the rise of the photon step.

Triangle shaping is known in the art. It was chosen because it can be computed efficiently from a digital data stream, using only four calculations per clock cycle, and the peak value of the output response occurs when the data sample closest to the center of the photon step rise appears between the two buffers 28 and 30.

The arrival of two photons very close together in time is detected in the fast data stream produced by fast ADC 36. This data is also fed through two programmable delay buffers 38 and 40 to produce three samples delayed in time which are used by the fast pile-up detect logic 42. In this case, the programmable delays are made a power of 2 to facilitate rapid scaling using bit shifts. This is not significant restriction, since the sampling rate is much faster than the measurement channel and the exact amount of delay in-the fast channel is not critical to the operation of the system.

The fast pile-up detect control registers 44 are used in determining the presence of a photon and whether or not pile-up has occurred. The three signals (pulse detect, pile-up, and reset detect) which are sent to peak detect and slow pile-up control logic 48 must go through alignment delay element 46. In general, delays 38 and 40 are much shorter than delays 28 and 30, because the triangle shaper in logic 48 must detect very low-energy photons and must therefore average over longer periods of time. Alignment delay 46 synchronizes the fast channel signals with the slow channel signals.

Peak detect and slow pile-up control logic 48 integrates the pulses from the fast channel alignment delay element 42 with its own internal pile-up checks to find and reject photons which arrive too close together to permit accurate location in the data stream. The peak detect control registers 50 control the delay in buffers 28 and 30 (and thus the width of the triangular output pulses) as well as the various internal functions of logic 48.

The logic in 48 also corrects the data stream for any slope not related to the arrival of photon steps before passing it on to ring buffer 32. Such a slope in the absence of incoming photons may be due to leakage current in the detector 14 or the first FET stage of the preamplifier 18, for example. Also, periodic signals of very long wavelength compared to the measurement time of a photon step can appear in the data due to acoustic or mechanical vibrations being picked up through capacitive coupling. These signals are known in the art as "microphonics." There is also the possibility of direct electronic pickup of low levels of common electromagnetic interference frequencies, such as the 60 Hz powerline frequency and its harmonics. Any such low-frequency signal in the data can be approximated by a straight line slope over the period of measurement of a photon step. If not corrected, such a slope would induce an error in the measured photon energy.

The outputs of the peak detect and slow pile-up control logic 48 are pulses indicating the locations in ring buffer 32 of "good steps," which are cleanly located rising edges from a single photon, and the locations of the beginning and end of pile-up regions in the data stream which cannot be used for measurement.

A "live time" signal is also generated, which is used by multi-channel analyzer 64 to correct the data acquisition time for photons lost in pile-up events in a manner well known in the art.

Cusp-weighted measurement filter control logic 52 accepts these outputs and uses them to select the proper weighting function to measure the energy of each photon indicated by a "good step" pulse. It computes the left interval from each good step to the preceding good step or end of pile-up region, and the right interval to the next good step or beginning of pile-up region, with a maximum interval on either side of 511 samples (corresponding at a 5 Mhz sampling rate to 102.2 microseconds). These intervals provide the 9 low-order address bits of coefficient set pointer lookup table 56. The 4 high-order address bits of table 56 are supplied by the set-select register in measurement control registers 54, and permits any of 16 different sets of weighting functions to be used.

The data word contained in lookup table 56 includes the low-order bits of the start address for a weighting function in left or right coefficient set data tables 58 and 60. The high-order address bit for tables 58 and 60 is supplied by logic 52 depending on whether the left or right lobe of the weighting function is required.

Once the good step location in ring buffer 32 and both left and right processing intervals are determined, logic 52 pre-loads the offset value from the measurement control registers 54 into the multiply accumulator 62, and initiates the flow of data from ring buffer 32 and coefficient data tables 58 and 60 through the multiply/accumulator 62.

When all coefficients and their corresponding data samples have been multiplied and accumulated, the output of multiply/accumulator 62 is fed to multi-channel analyzer 64, which increments a memory location corresponding to the measured energy in a manner well known in the art to acquire an energy spectrum, which is a histogram of the number of photons plotted against their measured energy.

Figure 5A:
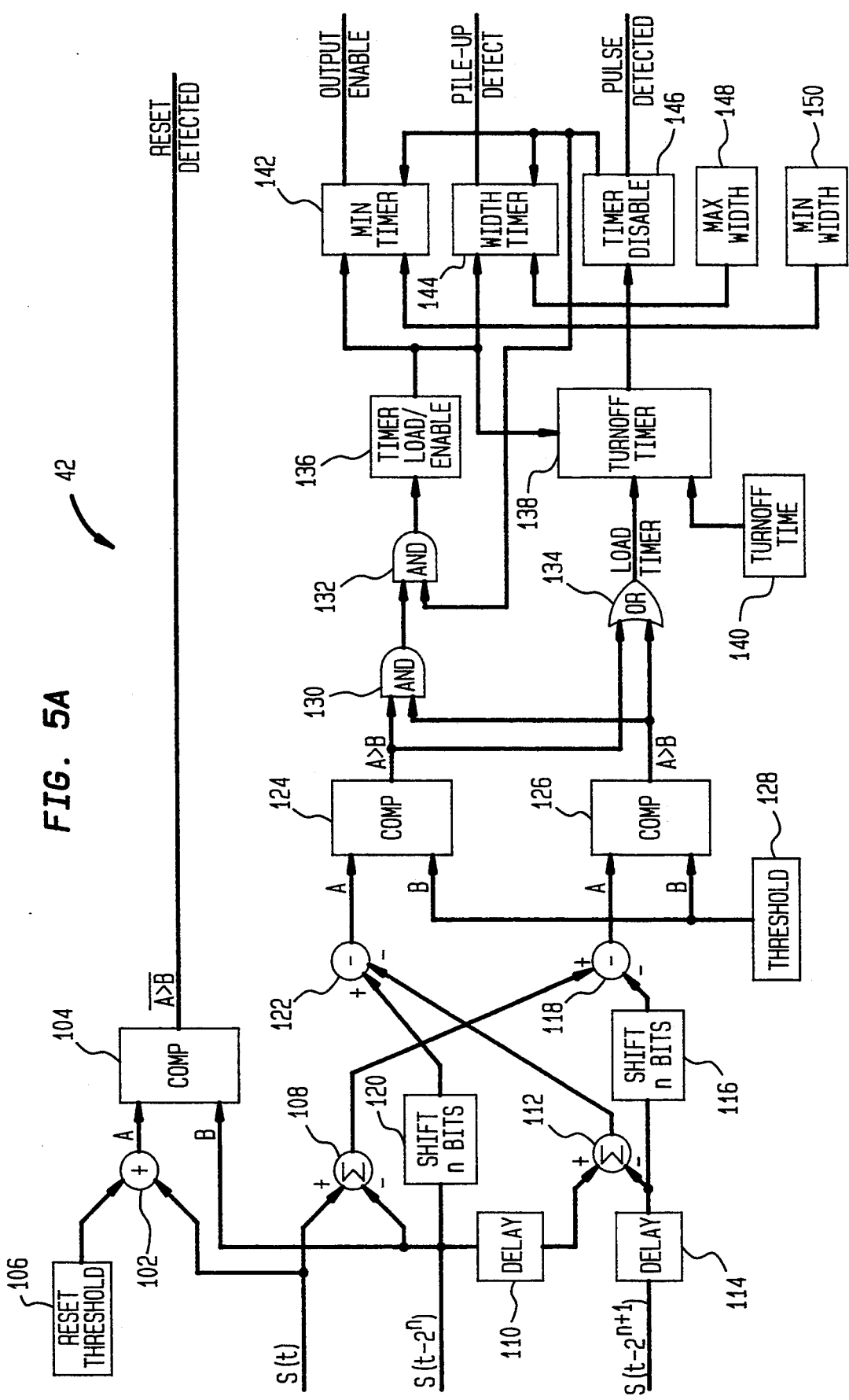
FIG. 5A illustrates details of the fast pile-up detector shown in FIG. 4.

FIG. 5A illustrates the fast pile-up logic 42 in more detail. The preamplifier 18 senses when its output voltage rises to a preset limit, after which it generates what is known in the art as a "reset" and rapidly restores the output to its lowest value. To detect this event, the most recent sample S(t) from fast ADC 36 is added to a reset threshold 106 in adder 102, and the result is fed to input A of comparator 104. The sample $2^n$ clock cycles before time t (output from delay buffer 38) is fed to input B of comparator 104. If the sum of S(t) and the reset threshold 106 is still less than the output of delay buffer 38, a reset detected pulse is generated.

The running sum of the previous $2^n$ samples before the present time t is maintained in accumulator 108 by adding S(t) and subtracting the sample $2^n$ fast clock periods prior to time t at each fast clock cycle. That delayed sample and another sample further delayed by $2^n$ fast clock periods are delayed still further in buffers 110 and 114, respectively, by a small fixed interval roughly equal to the rise time of a photon step.

A second running sum of the $2^n$ samples which start $2^n$ fast clock cycles plus a photon rise time prior to time t is maintained in accumulator 112 by adding the sample emerging from delay buffer 110 and subtracting the sample emerging from delay buffer 114 at each fast clock cycle.

The trailing sample of the leading running sum is shifted up by n bits (equivalent to multiplying it by $2^n$) in logic element 120, and the trailing running sum is subtracted from it by subtractor 122.

The output of subtractor 122 is compared to the fast-channel threshold 128 in comparator 123. Threshold 128 is contained in the pile-up detect control registers 44. Thus, the possible presence of a photon step is noted by the A>B output of the comparator 124 only after the leading running sum contained in accumulator 108 has already passed the photon step.

Confirmation that the response of comparator 124 is a real photon step and not just a momentary noise spike is provided by taking the trailing sample of the trailing running sum as it emerges from delay 114, shifting it up n bits in logic element 116, subtracting it in subtractor 118 from the leading running sum in accumulator 108, and comparing the result to threshold 128 in comparator 126. Only if both comparators 124 and 126 see their inputs rise above threshold 128 will AND gate 130 generate a trigger signal to AND gate 132. If that trigger occurs while timer disable 146 is in the disabled state, which indicates that no photon pulse is currently present, AND gate 132 causes timer load-enable 136 to load turnoff timer 138, minimum pulse width timer 142, and maximum pulse width timer 144 with the contents of turnoff time register 140, minimum width register 150, and maximum width register 148, respectively, and enables all three timers 138, 142 and 144 to start counting down to zero. When turnoff timer 138 becomes non-zero, timer disable 146 is toggled to the enabled state.

When turnoff timer 138 is enabled, OR gate 134 causes it to be continuously reloaded with the contents of turnoff time register 140 when either comparator 124 or comparator 126 detects that its input is above threshold 128. Thus, turnoff timer 138 can only reach zero when the inputs of both comparators 124 and 128 remain below threshold for a number of clock cycles equal to turnoff time register 140. When this occurs, timer 138 stops counting down and timer disable 146 turns off the two width timers 142 and 144 and generates a pulse-detected signal.

If the minimum pulse width timer 142 has not reached zero, this pulse is inhibited from reaching the alignment delay stage 46 and the triggering is assumed to have been a chance coincidence between positive and negative noise spikes which happened to occur at the right times to cause both comparators 124 and 126 to fire or a pile-up of two very low-energy photons.

If the maximum pulse width timer 144 has reached zero, a pile-up detected signal is generated, indicating that more than one photon step must have occurred while the timers were enabled.

Figure 5B:
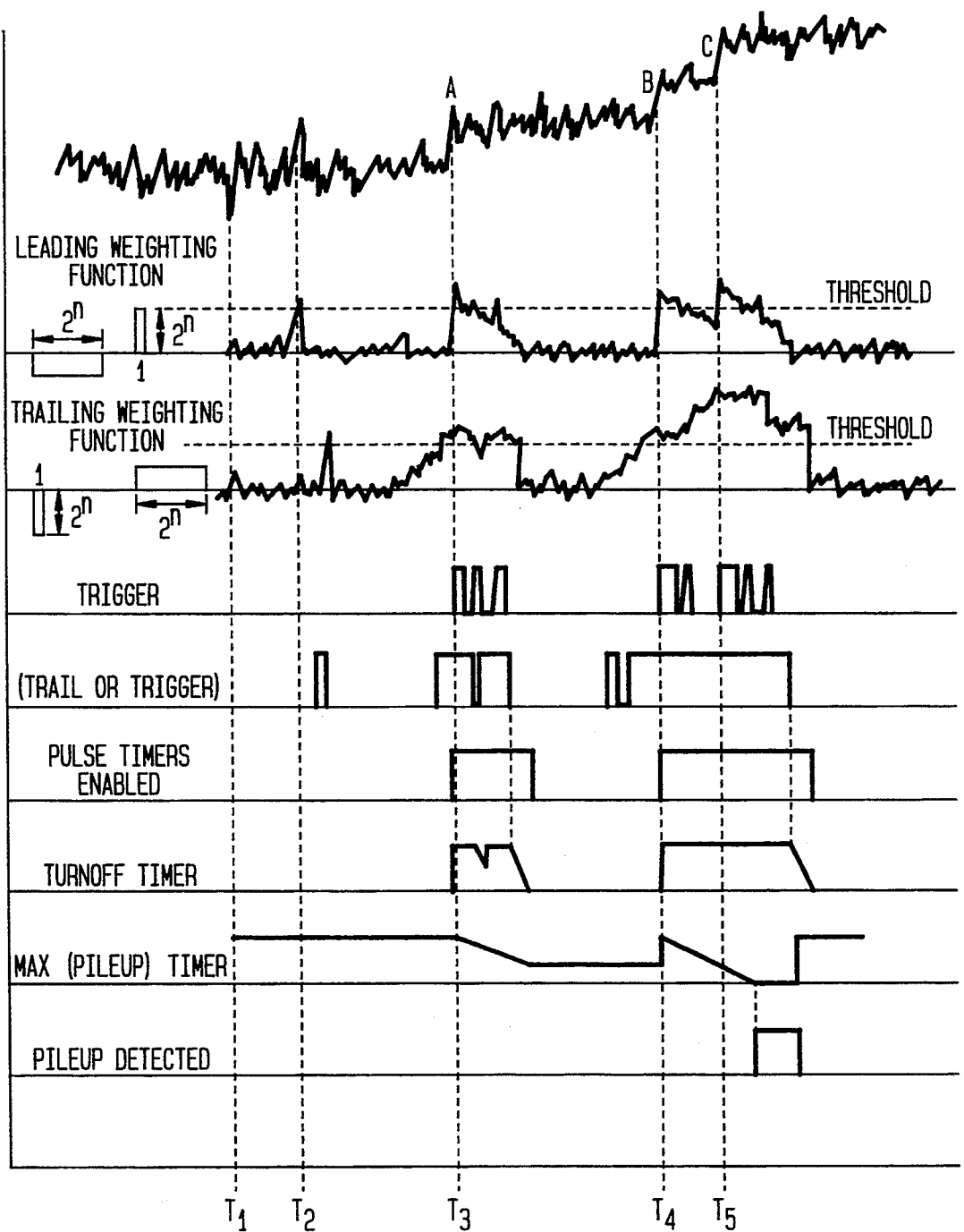
FIG. 5B is a graph illustrating the operation of the fast pile-up detector circuit of FIG. 5A.

The operation of the fast pile-up detection circuitry of FIG. 5A can be more easily understood by referring to the waveforms illustrated in FIG. 5B. Many methods of detecting pile-up are effective if the energy of the photon event is large, since the step is so high compared to the small fluctuations due to electronic noise. It is more interesting to look at the behavior of a pile-up detection circuit at the smallest step height it can distinguish from noise.

The top waveform of FIG. 5B shows the output (including noise) of preamplifier 18 having three low-energy photon events at times T3, T4, and T5. There is also a positive noise spike at T2 and a negative noise spike at T1.

The output of subtractor 122 is equivalent to convolving the data stream with the leading edge weighting function shown in the second line of FIG. 5B, consisting of a single data sample scaled up by $2^n$ and compared to the sum of $2^n$ earlier data samples as shown. The output of subtractor 122 rises briefly above threshold 128 (shown as a dashed horizontal line displaced above zero), but since the output of subtractor 118 remains below threshold 128, no trigger is generated.

The output of subtractor 122 jumps immediately above threshold 128 at time T3, then relaxes slowly towards zero in a linear fashion as the trailing running average moves over the photon step. The same behavior occurs for pulse B at time T4. Pulse C at time T5 causes the signal to jump upward again before it has relaxed all the way to zero.

The output of subtractor 118 is equivalent to convolving the data stream with the trailing edge weighting function shown in the third line of FIG. 5B, consisting of a single sample at the trailing edge of the trailing running sum which is scaled up by $2^n$ and compared to the sum of the $2^n$ samples before the trigger sample for the leading edge weighting function discussed above. Thus, the gap between the trailing edge single sample and the leading edge single sample is $2^n$ plus the small fixed delay generated by delay element 114. This gap, plus the rise time of a photon edge and the turnoff time 140, constitutes the "normal" pulse width of the response of the circuitry 42 to a single photon event.

It is necessary to make the maximum pulse width 148 slightly wider than this, because there is an error on either pulse edge of plus or minus one or two ADC samples due to the asynchronous nature of the arrival of a photon with respect to the ADC clock, and the influence of random noise fluctuations as the signal approaches the threshold 128 value. If the pile-up threshold 148 were set too low, some single photon events would be rejected because by chance coincidence with noise fluctuations, their pulse response width was too long.

Note that at extremely high count rates, where pulse pile-up is more probable, it may be desirable to allow some loss of legitimate single photon events in order to reduce the probability of accepting piled-up events. Prior art pile-up rejection techniques do not allow this tradeoff to be made.

Note also the response of subtractor 118 to the negative noise spike at time T1. This response happens when the trailing edge single sample crosses the spike, but the output of subtractor 18 is synchronized with the leading edge single sample, so the response occurs delayed after T1 by the gap described above. Since the leading edge function is not triggered, again nothing happens.

As the leading running sum crosses the photon step A at time T3, the response of subtractor 118 starts to creep up linearly. For a photon step barely energetic enough to trigger the fast channel, the response of subtractor 118 crosses the threshold just slightly before the leading edge single sample reaches the photon step. It's output remains above threshold 128 (possibly dropping below it briefly due to noise for low-energy photons) during the gap between the leading single sample and the trailing single sample, dropping below threshold 128 abruptly as the trailing single sample crosses the photon step.

In the case of photons B and C, separated by less than $2^n$ clock cycles, the output of subtractor 118 remains above threshold 128 until one gap length after photon C at time T5. Although it has an abrupt downward jump one gap length after T4 in response to the trailing single sample crossing photon step B, this is not enough to push it below threshold 128 since the leading running sum is already past photon step C.

The trigger signal in the fourth waveform of FIG. 5B shows the output of AND gate 130. It ignores the noise spikes and reliably indicates the photon steps A, B, and C at times T3, T4, and T5. For high energy, large photon steps, it will remain high during most of the gap period. For lower energy steps, as illustrated, it will drop back below the threshold 128 level quickly but may bounce up and down for a while due to noise.

The fifth waveform shows the output of OR gate 134, responding to either the leading or trailing weighting function rising above threshold. The interesting feature of this waveform is the brief dropout shortly after time T3, when the output of subtractor 122 has already declined below threshold 128 and the output of subtractor 118 goes below it momentarily due to noise. This causes the turnoff timer 138 to start counting down, as seen in the seventh waveform, but it is quickly reloaded with turnoff time 140 as the output of subtractor 118 returns above threshold 128.

The sixth waveform shows the period during which the three timers 142, 144, and 138 are enabled, and represents the pulse width to be measured for the possibility of pile-up. Note that it remains high for turnoff time 140 after the output of OR gate 134.

The seventh waveform shows the behavior of turnoff timer 138. It is loaded with turnoff time 140 when the trigger output of AND gate 132 first goes high, and cannot count down until neither subtractor 118 nor subtractor 122 is above threshold 128. When it reaches zero, as described above, the timers are disabled and the processing of the current photon step (or piled-up photon steps) is completed.

The last two waveforms show the behavior of the maximum pulse width timer 144. It starts to count down when the photon step A at time T3 triggers, but does not reach zero before all timers are disabled by turnoff timer 138 reaching zero. However, shortly after time T5, it does reach zero and cause the "pile-up detected" signal to be asserted.

The primary advantage of the present invention over the prior art is the ability to obtain good timing and low energy photon detection simultaneously. Previous techniques rely on conventional pulse shaping with a very short time constant, involving a differentiation of the signal followed by several integrations, which is sensitive to noise. Reducing the noise sensitivity meant giving up time resolution by lengthening the pulse shaping time. Thus, it was not possible to combine good timing with insensitivity to noise. Indeed, many prior art systems had 2 or 3 different pile-up detecting shapers with different time constants, in order to maintain good timing resolution for high-energy photons which doing a fairly good job on medium-energy and low-energy photons. While it was routine to resolve photons separated by only 0.25 microseconds at energies of 6.4 keV, this degrades rapidly to 1 microsecond at 1.5 keV and 15 microseconds for the carbon photon at 0.28 keV.

The timing resolution of the present invention depends only on the sampling rate of the ADC, since the leading edge trigger function reacts to the first significantly rising data sample and the trailing edge trigger function cuts off sharply at the end of the photon step rise.

The minimum detectable photon energy only requires that the step height shift the average of the signal enough that comparators 124 and 126 will fire simultaneously with high probability. Experimentally, this happens when the step exceeds around 70-80% of the average peak-to-peak excursion of the noise in the signal from preamplifier 18 in the absence of a photon. Using the data stream from the fast ADC 36, this limit is around 0.6 keV; using the more accurate but slower data stream from the measurement ADC 24, this limit includes the carbon 0.28 keV photon. Because of the differences in sampling rates, the best timing resolution from fast ADC 24 is about 0.2 microseconds, and the best timing resolution from slow ADC 36 is about 1.6 microseconds (twice what would be expected from clock rate alone, because of the larger influence on pulse width of noise variations being a higher fraction of the step height).

Thus, the timing performance of the invention is comparable to prior art for high energies, but far superior at energies below 1 keV.

Also, in the present invention, the running sums can be made wider, reducing sensitivity to false triggering by noise, without degrading the timing resolution. In the preferred embodiment, good performance is achieved with running sums in the range of 3 to 5 microseconds, although shorter intervals may be used at very high count rates.

For germanium detectors, where slow charge collection may cause low-end tailing of the spectrum peaks due to slower rise times of the photon step, such slow-rising steps will also produce pulse widths which exceed the pile-up limit and can be detected and rejected from the spectrum, improving spectrum peak shape.

Figure 6A:
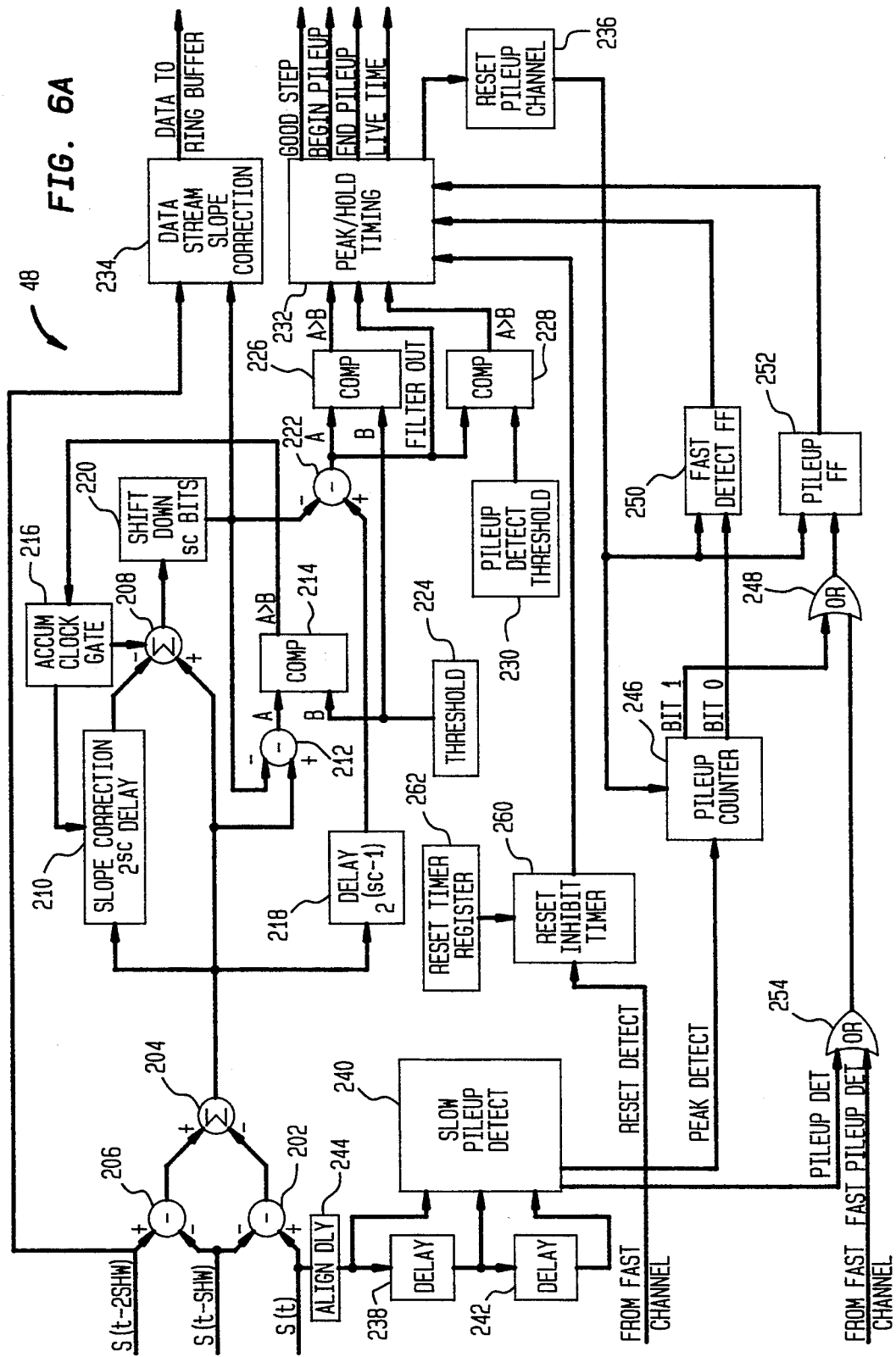
FIG. 6A illustrates the circuit and signal flow of the peak detect and pile-up logic circuit illustrated in FIG. 4.

FIG. 6A shows the peak detect and slow pile-up logic 48 in more detail. The delayed samples from programmable delay buffers 28 and 30 are labelled S(t-SHW) and S(t-2SHW), where SHW stands for "slow half-width." The first delayed sample S(t-SHW) is subtracted from the current sample S(t) by subtractor 202, and is also subtracted from the second delayed sample S(t-SHW) in subtractor 206. The two differences are added to accumulator 204, which, therefore, contains the difference of two adjacent running sums of width SHW, generating a triangle-shaped response function of width twice SHW to a photon step. The peak of this response occurs when the center sample of the photon rise appears at S(t-SHW), as described previously.

The difference of two running sums is also a measure of the slope of a signal in the absence of photon steps. If the signal includes noise, the difference of two running sums will fluctuate around an average offset level which is proportional to the slope in the absence of noise, as shown in FIG. 6G. The top line of FIG. 6G shows a sloping noise-free signal with two regions of width SHW surrounding a point on that signal. The result of subtracting the two running sums equals the total shaded area, and is constant as the two running sums move forward in time.

If the signal is noisy, the fluctuations due to noise will be superimposed on a constant positive offset due to the average slope, as shown in the center line of FIG. 6G. Thus, averaging the output of accumulator 204 over a period of time which is much longer than SHW will provide a measure of the slope of the signal during that period.

The output of accumulator 204 is fed through slope correction delay 210, whose length is $2^{sc}$ clock periods. In the preferred embodiment, SC is adjustable from 10 to 14, which at a 5 Mhz sample rate gives a delay from 0.2 to 3.2 milliseconds. This is long compared to SHW, which is typically 10 to 20 microseconds.

Accumulator 208 adds the current output of accumulator 204 and the delayed output from slope correction delay 210 to maintain a running sum of length $2^{sc}$ outputs from accumulator 204. Of course, in the actual signal there are photon steps present, and it is necessary to exclude the triangle-shaped responses of accumulator 204 to the photon steps from the running sum used to estimate the signal slope, otherwise, a positive error will be made in the slope estimate. This is accomplished by gating off accumulator 208 and slope correction delay 210 via accumulator clock gate 216 when comparator 214 senses its input rising above threshold 224, so that data is blocked from entering slope correction delay 210.

The output of accumulator 204 is not compared directly to threshold 224. In order to permit threshold 224 to be lowered as close to the noise response as possible, thus lowering the minimum detectable photon energy, the average output of accumulator 204 in the absence of photon steps for the previous $2^{sc}$ clock periods, as measured by the output of accumulator 208 shifted down SC bits at the A output of latch 220, is subtracted from the current output of accumulator 204 by subtractor 212, whose output is then compared to threshold 224 in comparator 214. This has the effect of eliminating the offset level shown in the bottom line of FIG. 6G, allowing threshold 224 to be lowered by the same amount. Less error is therefore propagated into the running sum used for slope correction, since the beginning of a photon step response is detected sooner and accumulator clock gate 216 is released later.

The threshold testing for peak detection and location is corrected in a similar fashion, but an additional delay 218, one-half the length of the slope correction delay 210 or $2^{sc-1}$ clock cycles, is imposed on the output of accumulator 204 before the average slope t the output of downshift latch 220 is subtracted from it in subtractor 222.

Figure 6B:
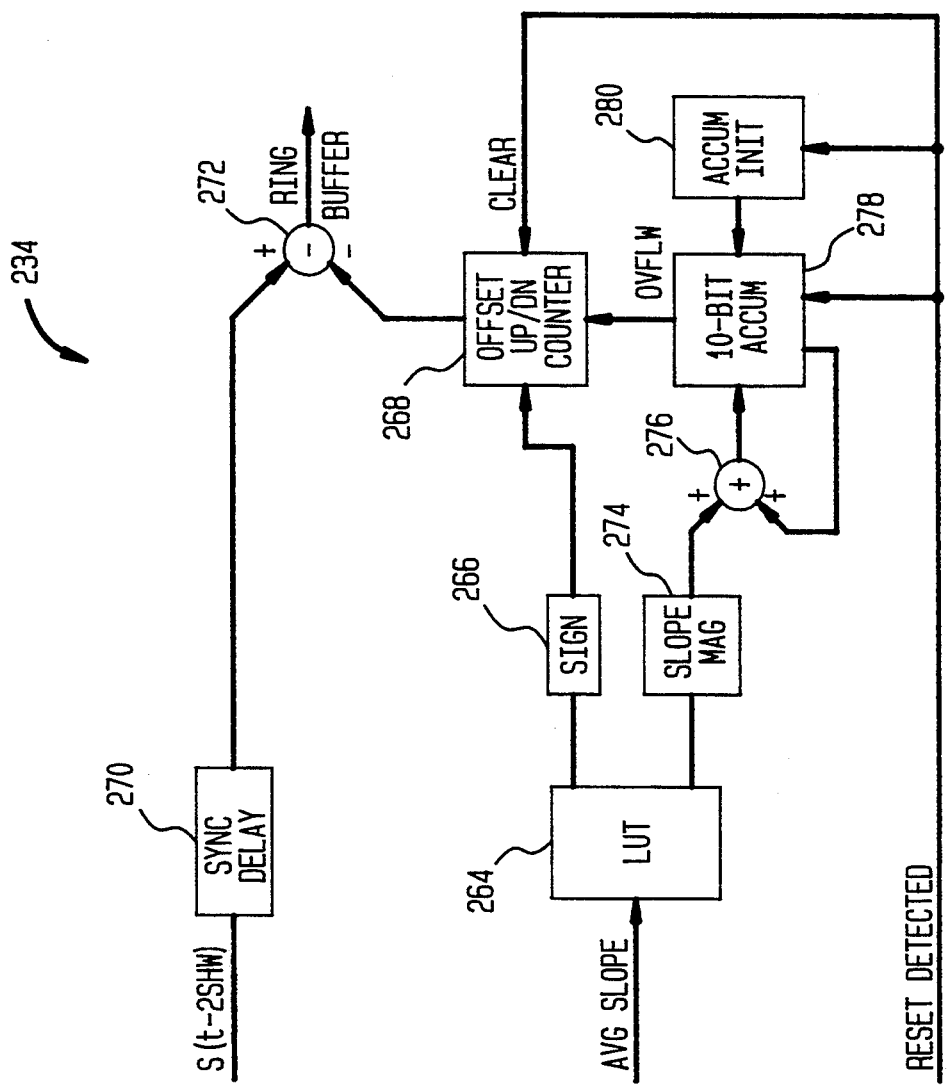
FIG. 6B illustrates details of the data stream slope correction circuit illustrated in FIG. 6A.
Figure 6C:
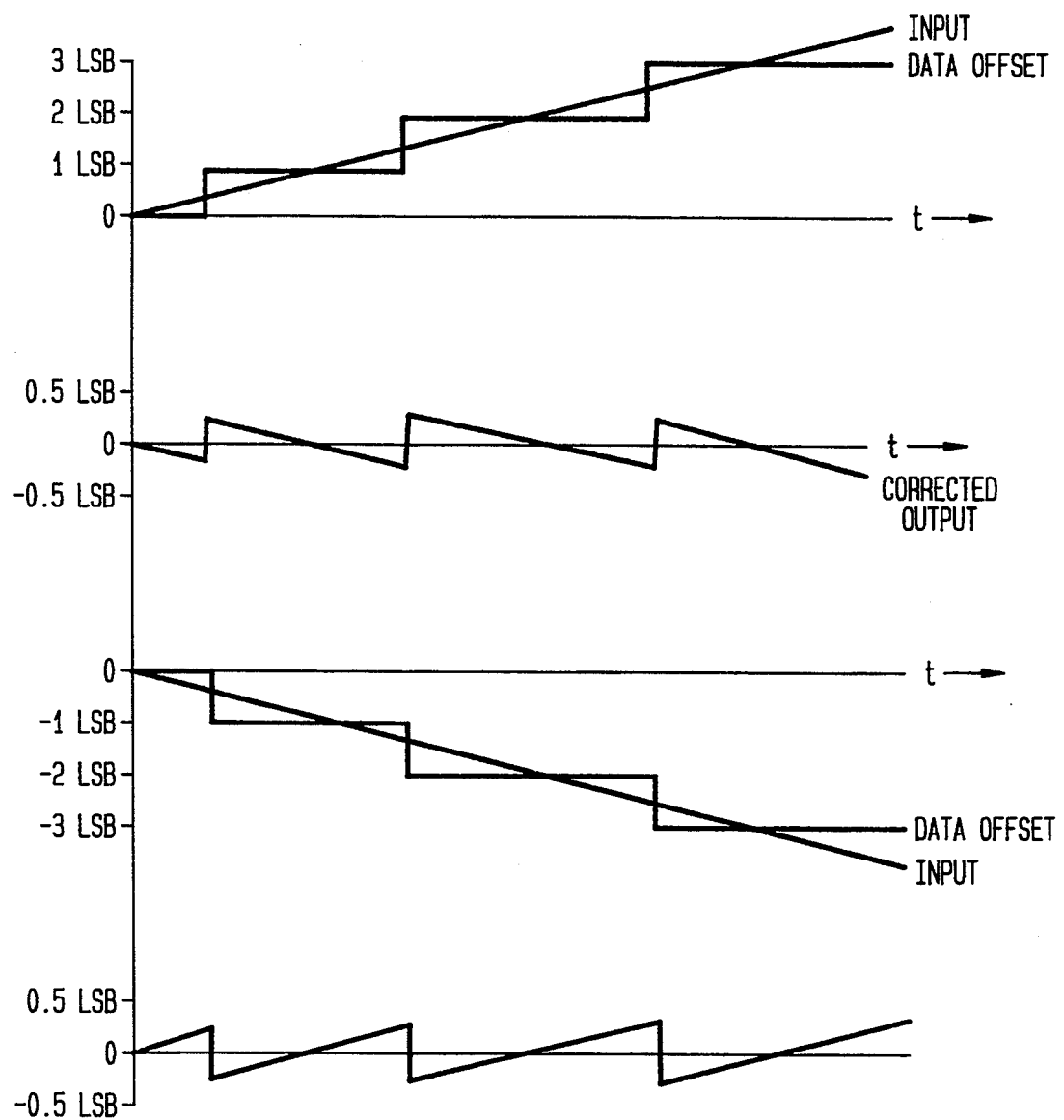
FIG. 6C is a graph illustrating the waveforms that characterize the data stream slope correction circuit illustrated in FIG. 6B.
Figure 6D:
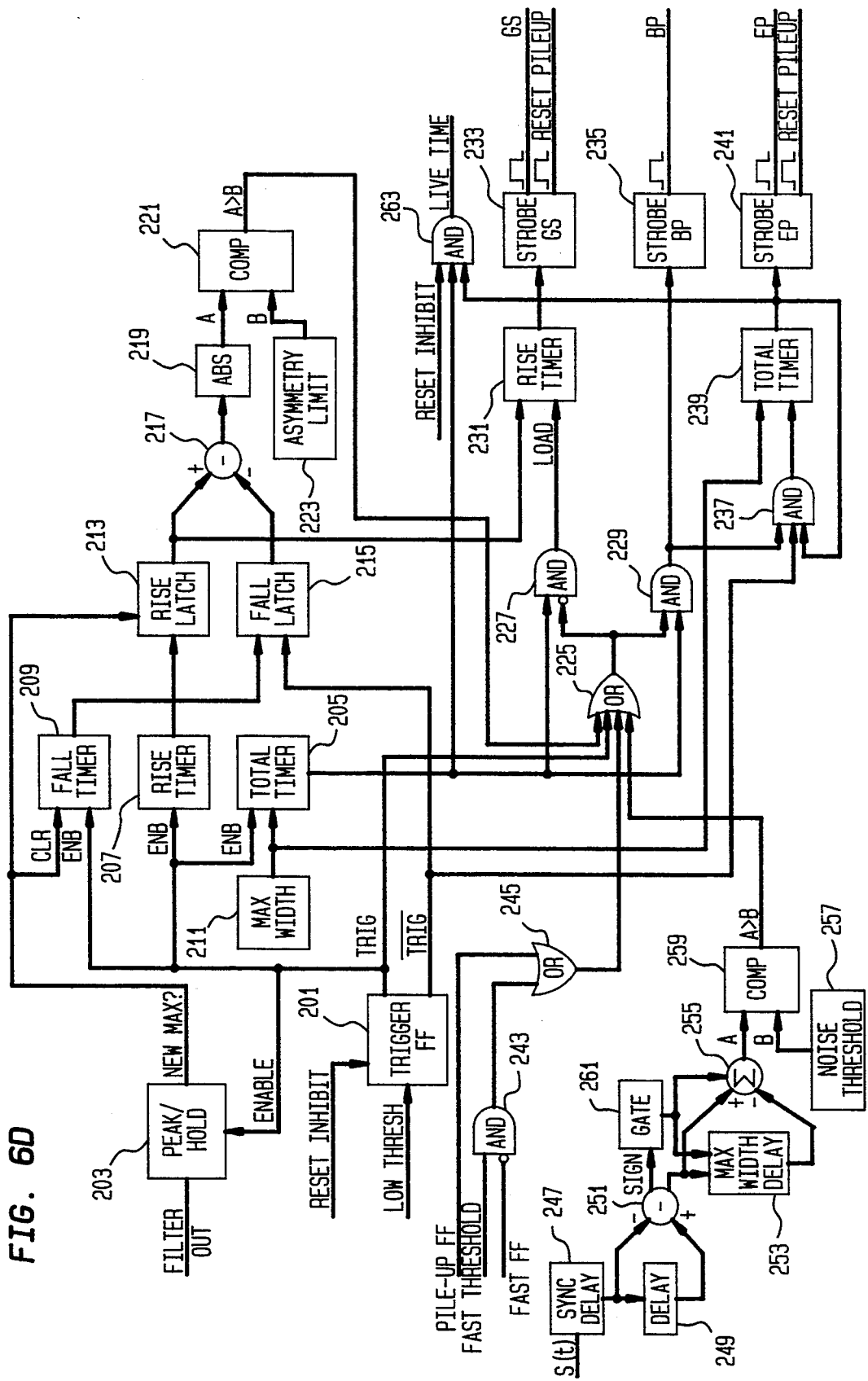
FIG. 6D illustrates circuit details of the peak/hold timing circuit illustrated in FIG. 6A.
Figure 6E:
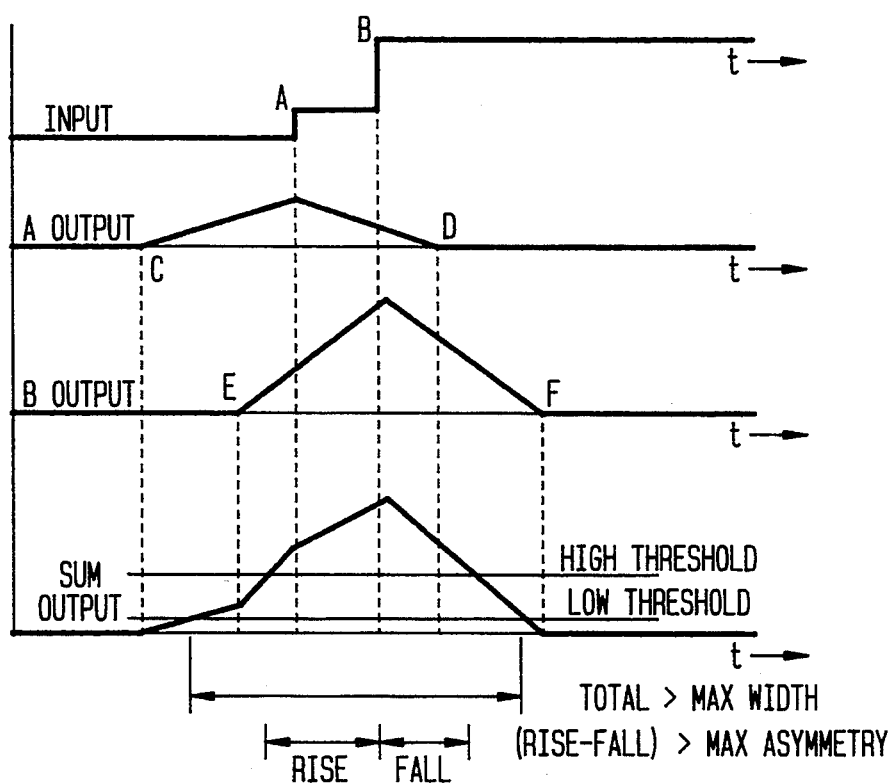
FIG. 6E is a graph of the waveforms associated with the peak/hold timing circuit illustrated in FIG. 6D.
Figure 6F:
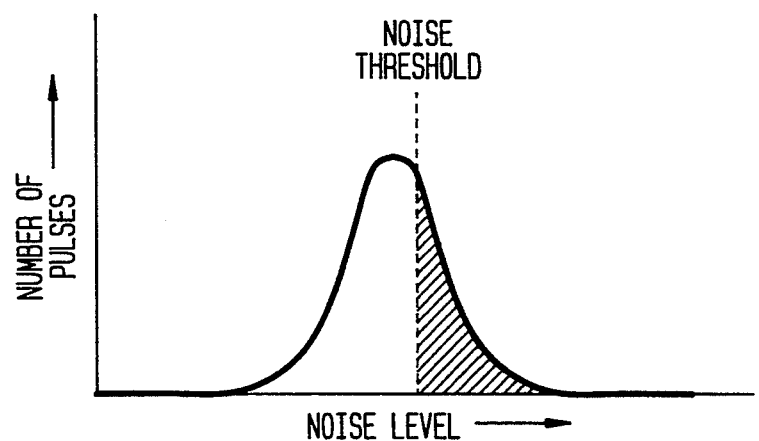
FIG. 6F is a graph of the number of pulses detected versus noise level and indicating the relationship to noise threshold.
Figure 6G:
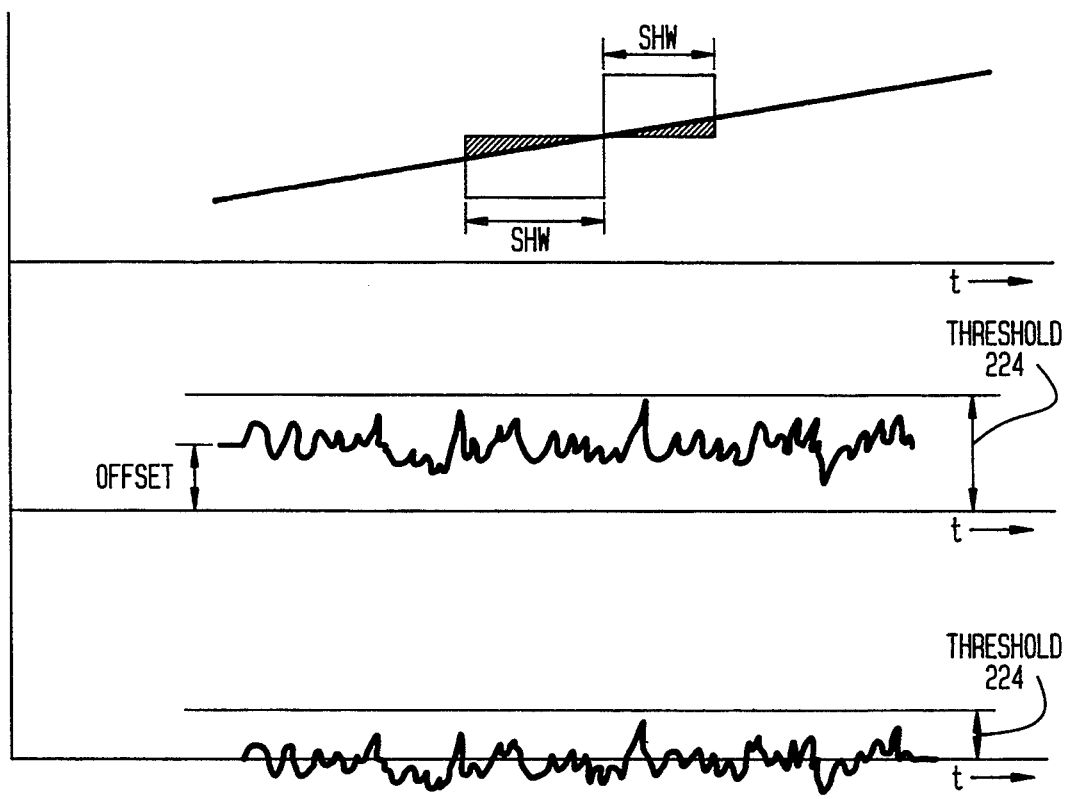
FIG. 6G is a graph illustrating how a slope in the data stream affects the threshold for incoming signals.
Figure 6H:
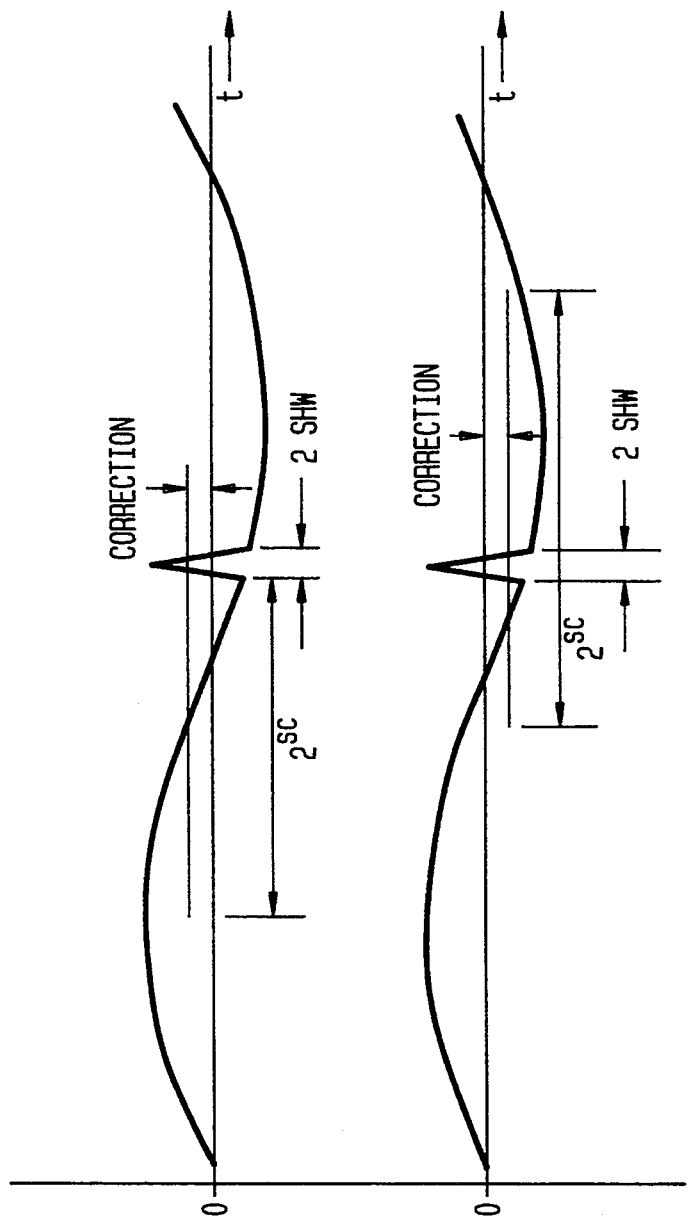
FIG. 6H is a graph illustrating the advantages of estimating microphonics errors using a region surrounding the photon event.

This has the effect of subtracting from the delayed output of accumulator 204 the average response of a region $2^{sc}$ clock cycles wide surrounding it, but not including the triangle-shaped response to the photon step, as illustrated in the bottom trace of FIG. 6H.

This is advantageous if the error induced in the output of accumulator 204 is not due to a truly constant slope, as from a leakage current, but due to pickup of periodic electronic signals or microphonics as discussed above, so that the error itself is not constant but varies with the same period as the microphonics.

FIG. 6H shows the output of accumulator 204 in the presence of a microphonic interference signal, greatly exaggerated for clarity. Any positive offset from leakage current and the noise fluctuations have also been ignored for clarity. One triangular response from a photon step to be measured is shown.

As the period of the microphonic interference signal becomes shorter, relative to the period $2^{sc}$ over which the correction is estimated, the "correction" can actually make the error worse if the preceding interval is used, as illustrated by the top trace of FIG. 6H. If the surrounding interval is used, the correction will still be in the right direction, although it will be less than the correct magnitude, as shown in the bottom trace of FIG. 6H. This is the case as long as the period of the interference signal is at least twice the $2^{sc}$ averaging period of the slope estimation region.

The delayed and corrected output of accumulator 204 emerging from subtractor 222 is compared with threshold 224 by comparator 226, and the result passed to peak/hold timing circuitry 232. The output of subtractor 222 is also compared in comparator 228 with another pile-up detect threshold 230, set to the expected maximum output of accumulator 204 for the lowest photon energy which can be reliably detected by the slow pile-up detector 240 (which is always less than the minimum photon energy which can be detected by fast pile-up detector 42). The output of comparator 228 is also passed to peak/hold timing circuitry 232.

This signal is advantageous because it allows the pile-up time resolution of slow pile-up detector 240 to be extended down to slightly over half it's minimum detectable photon energy, as follows. If the peak value from subtractor 222 exceeds pile-up detector threshold 230, but the event is not detected by slow pile-up detector 240, the response must be due to the close coincidence of two photons too low in energy to be detected directly by slow pile-up detector 240. For two such photons whose sum exceeds the minimum detectable energy, the pulse width of slow pile-up detector 240 will be reduced by the separation between them. If the reduced width is less than minimum width register 150, the output of slow pile-up detector 240 is inhibited.

Since slow pile-up detector 240 can reliably detect carbon photons at 0.28 keV, this technique permits the detection of close coincidences of boron photons at 0.185 keV within roughly 2 microseconds. This is at least 10 times better performance than could be achieved by the prior art.

The output of subtractor 222 is also fed directly to peak/hold timing circuitry 232 for use in locating the center of the photon step.

The second output of downshift latch 220 is fed to the data stream slope correction circuitry 234, which accepts the delayed data stream S(t-2SHW) emerging from programmable delay buffer 40 and corrects it to remove the slope proportional to the output of downshift latch 220 before passing it on to ring buffer 32.

Returning to the beginning of the pile-up detection channel, the current sample S(t) also passes through an alignment delay 244 which synchronizes the eventual output with the delayed and corrected output of subtractor 222. It then passes through two further delay elements 238 and 242. The outputs of delay elements 244, 238, and 242 are all passed to slow pile-up detector 240. This is functionally identical to fast pile-up detector 42 as described in FIG. 5A, but the clock rate is 4 times slower (5 Mhz instead of 20 Mhz), and the data stream is the 16 bit wide output of lookup table 26 instead of the 10 bit wide output of fast ADC 36. The improved bit precision and lower noise in slow ADC 24 permits slow pile-up detector 240 to detect photons with energies down to carbon at 0.28 keV but with poorer time resolution of about 1.6 microseconds, as described above.

Pile-up counter 246 counts all photon steps detected by slow pile-up detector 240 while peak/hold timing circuitry 232 is processing a photon step. All single photon steps detected by fast pile-up detector 42 will also be detected by slow pile-up detector 240, so the peak detect signal from fast pile-up detector 242 is not used.

Bit zero of pileup counter 246 sets fast detect latch 250, which is used by the peak/hold timing circuitry. 232 as described above to check for the pile-up of extremely low energy photons.

The pile-up detect signals from fast pile-up detector 42 and slow pile-up detector 240 are combined in OR gate 254, which is then combined with bit 1 of the pile-up counter 246 in OR gate 248 to set pile-up latch 252 if any pile-up occurs. The output from this latch is fed to peak/hold timing circuitry 232.

When peak/hold timing circuitry 232 finishes processing a photon step, it triggers pile-up channel reset logic 236, which clears pile-up counter 246, fast detect latch 250, and pile-up latch 252.

FIG. 6B provides operational details of the data stream slope correction circuitry 234. The data stream S(t-2SHW) emerging from programmable delay buffer 30 must be fed through synchronizing delay 270 so that the output of downshift latch 220 represents the average output of accumulator 204 from a region surrounding the data sample emerging from delay 270. The amount of delay introduced by delay 270 can be calculated as $2^{(sc-1)}$ minus SHW. This is advantageous when the slope may not be due to constant leakage current, but to a periodic interference signal as discussed previously.

The output of downshift latch 220 is converted by lookup table 264 into a slope magnitude 274 and a slope sign 266. Slope sign 266 corresponds to the sign of downshift latch 220. Slope magnitude 274 is in units of least significant bits (LSBs) of slope per 1024 samples.

So, for example, a value of 2 means 2 LSBs of slope over 1024 samples. The value 1024 was chosen because the maximum measurement weighting function half-width has 511 coefficients, so the maximum possible processing time is 1022 samples. Therefore, a slope of less than one LSB in 1024 samples is not worth correcting.

The magnitude entries in lookup table 264 are computed as follows. The output of downshift latch 220 is the average Output level of accumulator 204 in the absence of photon steps, which is itself SHW squared times the average slope per sample. So to convert to average slope per sample times 1024, it is necessary to multiply the output of downshift latch 220 by $(1024/SHW^2)$. The number of entries required in the lookup table is the range of values expected for the output of downshift latch 220. Measured slopes in the data stream range up to about 100 LSBs per 1024 samples. Inverting the above calculation for the largest reasonable SHW of around 40 microseconds (200 samples) gives a table of 3900 entries. The preferred embodiment uses an 8 k (8192) entry table for some margin of safety.

The magnitude derived from lookup table 264 and stored in slope magnitude latch 274 on each clock cycle is added to the current contents of 10-bit accumulator 278 by 10-bit adder 276, and the result stored back in accumulator 278. When the sum exceeds 1024, the carry bit from the 10-bit adder 276 is propagated to the overflow bit of the accumulator 278 and causes up/down offset counter 268 to be incremented or decremented, depending on whether the sign of the slope is positive or negative according to sign latch 266. The remaining fractional part of the accumulated offset is retained in accumulator 278. The offset in counter 268 is subtracted from the delayed data stream emerging from sync delay 270 in subtractor 272, and the slope-corrected data sent on to ring buffer 32.

When a reset pulse is detected, the accumulator initialization value 280 (normally 512 for rounding) is loaded into the 10-bit accumulator 278. The reset pulse also causes the offset up/down counter 268 to be cleared.

The behavior of the data stream slope correcting circuitry 234 illustrated in FIG. 6B can be understood more fully by reference to the waveforms shown in FIG. 6C. The top trace shows a rising input signal and the contents of offset up/down counter 268 plotted against time. The next trace shows the corrected output in ring buffer 32. The residual error is $+/-0.5$ LSB.

The next two traces illustrate the behavior of the circuit when the slope is negative. The corrected data is the mirror image of the corrected data for a positive slope.

It should be noted that the data path at this point in the circuit is 16 bits wide, so an LSB is $\frac{1}{4}$ of an LSB from the 14-bit slow ADC 24. It is very likely that the error in the slope estimation exceeds the residual quantization error in the slope correction, which is therefore not of concern.

FIG. 6D provides details of the operation of peak/hold timing circuitry 232. Essentially, this circuitry finds the peak of the response from the triangle shaping, and tests for all the reasons why a photon step might be rejected for measurement.

A low-threshold-exceeded signal from comparator 226 toggles trigger flip-flop 201, unless reset inhibit timer 260 is non-zero. The positive trigger output of trigger flip-flop 201 clears and enables peak/hold circuit 203, clears and enables rise timer 207 and fall timer 209, and causes max width 211 to be loaded into total timer 205. Max width 211 is twice SHW, and is therefore the maximum total time above threshold for the triangle shaping response.

Total width timer 205 is a down counter, and must reach zero before any output can happen from the peak/hold timing circuitry 232. This introduces a delay in the good step, begin pile-up, and end pile-up signals which must be compensated in address counter 326 of cusp-weighted measurement filter control logic 52, which will be explained more fully later.

Rise timer 207 and fall timer 209 count upward from zero when enabled. When peak/hold 203 detects a new maximum value in the filter out data stream, fall timer 209 is cleared and the current value of rise timer 207 is latched into rise latch 213. Thus, rise latch 213 will contain the number of clock cycles from the positive trigger transition of trigger flip-flop 201 to the maximum value of the filter out data stream.

When the low-threshold-exceeded signal goes low, the not-triggered output of trigger flip-flop 201 loads the contents of fall timer 209 into fall latch 215. Subtractor 217 computes the difference between the contents of rise latch 213 and fall latch 215, which is then converted to its absolute value by logic 219. The magnitude of the absolute value of the difference between the rise time and the fall time is compared in comparator 221 to asymmetry limit 223. The output of comparator 221 is connected to OR gate 225.

The usefulness of an asymmetry check is best understood by referring to the waveforms shown in FIG. 6E. The top trace shows an idealized output from preamplifier 18 containing two photon steps closer together than max width 211, which in this idealized figure is the distance between times C and D and also between times E and F.

The second trace of FIG. 6E shows the triangle shaping response to the first, smaller photon at time A if photon B were not present. The third trace shows the triangle shaping response to the second, larger photon B if photon A were not present.

Since digital triangle shaping is a perfectly linear operation, the response to the complete signal shown in the bottom trace of FIG. 6E is the sum of the responses to the individual photon events shown in the middle two traces. Note that the maximum response comes at the larger of the two photon steps, but the shape of the response is distorted from a symmetrical triangle.

If the photon energies are both high, so the detection threshold 224 is very low with respect to the height of the response function, the pile-up will be detected because the total time trigger flip-flop 201 remains triggered will exceed max width 211. Also, both photons A and B will have been detected by slow pile-up detector 240, which will cause pile-up latch 252 to be set as described above.

The challenging case occurs when at least one of the photons A or B is too low in energy to be detected by slow pile-up detector 240. In that case, threshold 224 will be a much larger fraction of the height of the response function, as shown by the "high threshold" line. Then the time above threshold will not exceed max width 211, but will be longer on the side of the smaller photon step. This asymmetry between rise and fall times permits the detection of small photons near larger ones.

Prior art systems, even those with multiple pile-up detection channels of differing time constants, often have trouble when photons A and B are interchanged, i.e. when the smaller photon trails the larger photon. The reason for this is that the long time-constant pile-up channel is swamped by its response to the large photon, and fails to return below its detection threshold in time to detect the small trailing photon as a separate event. The present invention avoids this failure.

Even in the present invention, the asymmetry limit check has much worse timing resolution than fast pile-up detector 42 or slow pile-up detector 240. The reason for this is that asymmetry limit 223 cannot be too tight, because at the low photon energies which will be missed by pile-up detector 240, the slope of the triangle shaping response is shallow. Therefore, noise introduces significant uncertainty in the threshold crossing time and single photon events at low energies will display relatively large variability in asymmetry.

In order to provide good pile-up detection for two low-energy photons, the pile-up-detection-threshold-exceeded signal from comparator 228 is connected to one input of AND gate 243, and the fast detect latch 250 is connected to an inverting input of AND gate 243. The output of AND gate 243 will go high if pile-up detect threshold 230 is exceeded but no photon step was detected by slow pile-up detector 240. As discussed above, this can discriminate between two piled-up photons of very low energy and a single photon of sufficient energy to trigger slow pile-up detector 240. This will detect coincidence of low-energy photons which are too close in time to be detected by checking asymmetry as described above.

The present invention has a further novel approach to testing whether a particular photon step should be measured or not. It is characteristic of electronic noise that it is not constant over time, but comes in bursts such that certain regions of the signal have greater or lesser noise levels. It is possible to estimate the local noise level in the vicinity of a photon step. Over many thousands of photon steps, the noise level will have a Gaussian distribution as shown in FIG. 6F. It is therefore possible to reject selectively those photon steps with local noise levels higher than a given threshold.

Such an estimate can be made, even in the presence of a photon step, by integrating over a period of time equal to max width 211 all differences between a data sample and the data sample one or two photon step rise times previous to it for which the trailing sample is larger than the leading sample. Across a photon step, the leading sample will be larger than the trailing one, so the height of the photon step will not affect this estimator of local noise. Since the signal fluctuations due only to noise are random, the differences between two nearby samples will be negative or positive with equal probability, so selecting only differences of one sign will still be a valid indicator of the magnitude of noise fluctuations locally.

The method will be sensitive to large noise spikes both above and below the average signal level. Positive-going noise spikes will contribute to the estimator when the trailing sample of the pair crosses them, and negative-going spikes will contribute when the leading sample of the pair crosses them.

The current data sample S(t) enters synchronizing delay element 247, which delays S(t) to align it in time with the filter out signal emerging from subtractor 222. A short delay FIFO 249 creates the desired gap of two to four clock cycles (at the 5 Mhz sampling rate, corresponding to 0.4 to 0.8 microseconds). The sample emerging from sync delay 247 is subtracted from the further delayed sample emerging from FIFO 249 in subtractor 251. The sign of the result is tested in gate 261, which only allows data to enter delay element 253 if the output of subtractor 251 is positive, i.e. the trailing data sample is larger than the leading data sample. Gate 261 also gates off accumulator 255 unless the output of subtractor 251 is positive.

Delay element 253 delays the differences for a number of clock cycles equal to SHW, on the assumption that half the differences will be of the correct sign and the desired period of the running sum of noise differences accumulated in accumulator 255 is twice SHW. The running sum generated by accumulator 255 is compared to noise threshold 257 in comparator 259. If the output of the accumulator 255 exceeds threshold 257, a signal appears at one of the inputs to OR gate 225.

When total timer 205 reaches zero, AND gates 227 and 229 are enabled. The output of OR gate 225 therefore controls which path is taken through the remaining logic. The output of OR gate 225 is connected to the inverting input of AND gate 227 and the noninverting input of AND gate 229. If none of the inputs to OR gate 225 are high, AND gate 227 causes rise latch 213 to be loaded into rise timer 231. Rise timer 231 counts down, and when it reaches zero, a "good step" pulse is generated by latch 233, max width 211 clock cycles after the center of the photon step rise which corresponds to the peak response of peak/hold 203.

If any of the inputs to OR gate 225 are high, AND gate 229 causes a "begin pile-up" pulse to be strobed by latch 235, max width 211 clock cycles after the first triggering of trigger flip-flop 201.

The output of AND gate 237 will only go high if the output of AND gate 229 is high, indicating the presence of a pile-up region, and trigger flip-flop 201 is in the not-triggered state, and timer 239 is not already counting down the end of a pile-up region. If all these conditions are true, total timer 239 is loaded with max width 211 and begins to count down. When it reaches zero, it causes latch 241 to generate an "end of pile-up" pulse max width 211 clock cycles after trigger flip-flop 201 enters the not-triggered state.

AND gate 263 generates a live time clock using the "busy time" live time correction method well known in the art. The output of AND gate 263 is high only when the system is ready to begin processing a pulse. It is therefore gated off when any of the following conditions occur: (1) reset inhibit timer 260 is not zero; (2) total timer 205 is not zero, indicating the active processing of a photon step or pile-up region; (3) total timer 239 is not zero, indicating that the end of a pile-up region has not yet been reached.

Figure 7A:
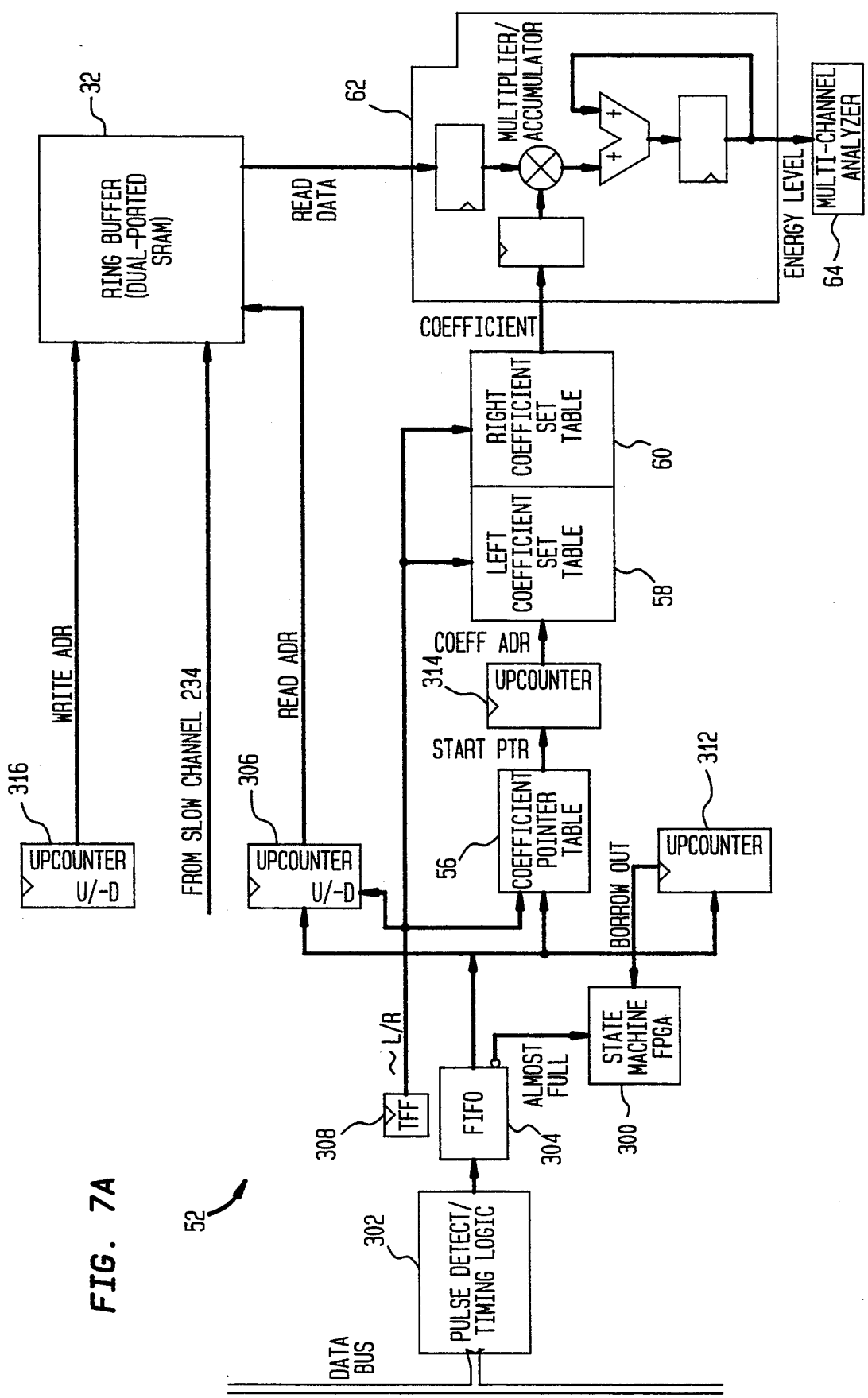
FIG. 7A is a signal flow diagram of the energy measurement section of the invention illustrated in FIG. 4.

FIG. 7A illustrates cusp-weighted measurement filter control logic 52 in more detail. This is where the asymmetrical filter weighting functions are applied to the data in ring buffer 32 in order to measure the energy of photon steps at the locations in ring buffer 32 indicated by "good step" pulses.

Pulse detect/timing logic 302 accepts the good step, begin pile-up, and end pile-up pulses generated by peak/hold timing logic 232, and pushes three data items into FIFO 304; (1) a left measurement interval; (2) the address in ring buffer 32 of the center of a photon step; and (3) a right measurement interval.

FIFO 304 includes a programmable almost-full flag output which is used to drive state machine FPGA (field-programmable gate array) 300. The programmable almost-full count is set to 3, so that when at least one full set of the three data items described above is available in FIFO 304, state machine FPGA 300 can initiate the measurement process. State machine FPGA 300 provides control signals to all elements of FIG. 7A between the pulse detect and timing logic 302 and the multi-channel analyzer 64. These connections have been left off the diagram for clarity.

FPGAs are commercially available parts whose internal logic functions are programmable. The preferred embodiment makes use of the Xilinx XC4000 series from Xilinx, Inc., Santa Clara, Calif. Such devices are normally not programmed directly with low-level logic functions such as AND and OR gates, but can be programmed automatically by commercial software (also supplied by Xilinx) which allows the designer to use an event-driven description of the desired behavior known in the art as a "state diagram." When an FPGA has been programmed to such behavior, it is operating as a "state machine." The operation of the circuitry of FIG. 7A will be explained with reference to the state diagram shown in FIG. 7D.

The blocks in FIG. 7D each represent a state in which the circuitry of FIG. 7A remains until acted upon by the signals (or logical combination of signals) attached to one of the arrows leading away from that block.

The first two blocks of FIG. 7D handle power-up initialization of the system and are not important to understanding the flow of data through the present invention. After initialization, counter 316 generates the address in ring buffer 32 to which the slope corrected data stream at the output of slope correction circuitry 234 is written, and FPGA 300 waits for the arrival of the first "almost full" signal from FIFO 304.

On receipt of the almost-full signal, FPGA 300 resets multiply/accumulator 62 and gets the first (left) measurement interval from FIFO 304. This value is loaded into interval processing timer 312, and is also used as the address in coefficient pointer lookup table 56 from which to get the starting address for left coefficient set lookup table 58. This start address is then loaded into counter 314.

Next, FPGA 300 gets an address from FIFO 304 corresponding to the location in ring buffer 32 of the center of the photon step edge to be measured, and loads this address into up/down counter 306. Also, the left/right toggle flip-flop 308 is toggled left, which causes read address counter 306 to count down (backwards in time) from the center of the photon step detected in ring buffer 32. The output of toggle flip-flop 308 also determines which of the coefficient set tables 58 (left) or 60.(right) will be used to supply coefficients to multiply/accumulator 62.

On receipt of the signal "not done," which is the inverse of the borrow-out signal from process timer 312 on each clock cycle, the next data sample from ring buffer 32 addressed by counter 306 and the next coefficient in left coefficient set table 58 addressed by counter 314 are fed to multiply/accumulator 62, where they are multiplied together and added to the cumulative sum. This cycle is repeated until receipt of a "done" signal, which is the borrow-out signal from process timer 312.

On receipt of the done signal, the location in ring buffer 32 of the center of the photon step edge to be measured is loaded again into up/down counter 306. The next entry in FIFO 304, which is the right measurement interval, is used as the address in coefficient pointer lookup table 56 from which to get the starting address for right coefficient set lookup table 60. This start address is then loaded into counter 314. Also, the left/right toggle flip-flop 308 is toggled right, which causes read address counter 306 to count up (forwards in time) from the center of the photon step detected in ring buffer 32. The output of toggle flip-flop 308 also selects right coefficient set table 60 which will be used to supply coefficients to multiply/accumulator 62.

The particular multiplier/accumulator part used in the preferred embodiment (IDT7210L125J, Integrated Device Technology, Santa Clara, Calif.) requires one clock cycle to change the sign of the accumulated sum, which is necessary because the accumulated sum of the left half of the digital filter weighting function must be negative as discussed previously. Rather than add more circuitry to accommodate this extra clock cycle, the first data entry in the right coefficient set table 60 is always zero so the first clock cycle processing the right half of the weighting function has no effect other than to negate the accumulated sum. On the first receipt of a "not done" signal, multiply/accumulator 62 is set to no longer invert the accumulator contents each cycle.

On the next receipt of "not done," the next data sample from ring buffer 32 addressed by counter 306 and the next coefficient in right coefficient set table 60 addressed by counter 314 are fed to multiply/accumulator 62, where they are multiplied together and added to the cumulative sum. This cycle is repeated until receipt of a "done" signal, which is the borrow-out signal from process timer 312 as described above.

On the next receipt of the done signal, the clocking of the counters 306 and 312 and multiply/accumulator 62 are disabled. The output of multiply/accumulator 62, representing the energy of the measured photon step edge, is sent to multi-channel analyzer 64 for inclusion in an energy spectrum as described previously. FPGA 300 remains in this state until the next appearance of the "almost full" flag, unless the circuitry is disabled under software control (which is done before changing the contents of the coefficient tables, for example).

Substantial savings in memory (and therefore cost, power, and space on the circuit boards) is achieved by using coefficient set pointer lookup table 56 instead of simply making tables 58 and 60 large enough to hold all possible weighting functions from 0 to 511 samples wide, which would require more than 131,000 entries per coefficient set.

As FIG. 1 shows, resolution changes much more rapidly at short processing times than long ones. Therefore, at longer processing times, a single weighting function can be "recycled" for use over a 5 or 10 microsecond span by padding it with trailing zeroes in the data tables 58, 60 and replicating its start address in the lookup table 56 for each of the interval entries in that span.

For example, consider a 50 microsecond weighting function. If it is padded with 10 microseconds of trailing zeroes, all intervals from 50 to 59.8 microseconds (50 different intervals, in terms of 5 Mhz samples) can be handled with the 50 microsecond weighting function with little loss of performance. Fortunately, the preferred embodiment only needs a weighting function for every interval when the intervals are very short. A complete coefficient set can be packed into 8,000 to 10,000 entries.

FIG. 7B illustrates circuit details of the pulse detect and timing logic 302. This circuitry is also controlled by a state machine FPGA 340, whose state diagram is shown in FIG. 7C. State machine FPGA 340 is also connected to all elements of FIG. 7B, and specifically to the input side of FIFO 304.

The first two state blocks of FIG. 7C represent initialization of the circuitry to a known condition. Address counter 326 is initialized max width 211 locations prior to address counter 316, to compensate for the delay introduced in peak/hold timing logic 232 by total timer 205. Address counter 326 is used to track the read addresses in ring buffer 32 which correspond to the arrival times of the good step, begin pile-up, and end pile-up signals from peak/hold timing logic 232.

The minimum interval preload 320 is a user-selectable minimum separation required to measure a photon step, which may be greater than the interval which causes peak/hold timing logic 232 to sense a pile-up. For operation at the best possible energy resolution regardless of throughput considerations, minimum interval preload 320 may be chosen to be as high as 100 microseconds. In that case, only photon steps with intervals on both sides larger than 100 microseconds will be measured, moving the operating point far to the right on FIG. 1.

The signal identifiers used in the state diagram of FIG. 7C are:
  GS=good step
  BP=begin pile-up region
  EP=end pile-up region
  PFLAG=flag set between BP and EP
  MIN OK=high when minimum interval timer 322 times out The first event generated after a power-up initialization sequence is EP, so state A on the far left of FIG. 7C is entered first. On entering this state, minimum interval preload 320 is loaded into minimum interval timer 322, which begins counting down. Interval timer 324 is cleared. BP events are ignored, and another EP event causes timer 322 to be reloaded with minimum interval preload 320 and interval timer 324 to be cleared. If another GS appears before MIN OK rises (i.e. before timer 322 times out), timer 322 is again reloaded with minimum interval preload 320 and interval timer 324 is cleared.

FPGA 340 will remain in state A until a GS pulse appears for which MIN OK is true, at which time FPGA 340 enters state B, which loads left address/interval pair 334. Address 336 is loaded with the contents of address counter 326, and left interval 338 is loaded with the contents of interval counter 324. Interval counter 324 is then cleared and begins to count the right measurement interval.

FPGA 340 can leave state B in one of three ways. If a GS or BP pulse is received before MIN OK goes high, the current photon step cannot be measured and FPGA 340 returns to state A.

If interval timer 324 reaches its maximum value of 511 clock periods before any other event occurs, FPGA 340 will move to state C, which loads the right address/interval pair 328. Address counter 326 is loaded into address 330. Right interval 332 is loaded with interval timer 324, which contains its maximum value of 511. Left address/interval pair 334 and right interval 332 are shifted into FIFO 304 to form a complete set of the three data elements required to measure the energy of a photon step as described previously.

FPGA 340 will remain in state C until either a GS or EP is received. BP events are ignored. If GS is received, FPGA 340 returns to state B with a maximum value of 511 in interval timer 324 as the left interval for the next photon step. If EP is received, FPGA 340 returns to state A to begin timing the next left interval.

From state B, if a GS or BP pulse is received after MIN OK goes high, FPGA 340 moves to state D, which also loads the right address/interval pair 328. Address counter 326 is loaded into address 330. Right interval 332 is loaded with interval timer 324. Left address/interval pair 334 and right interval 332 are shifted into FIFO 304 to form a complete set of the three data elements required to measure the energy of a photon step as described previously. Then right address/interval pair 328 is copied into left address/interval pair 334, since if the event which caused FPGA .340 to enter state D was GS, the right interval of the previously measured photon step will be the left interval of the photon step which generated GS.

FPGA 340 can leave state D in one of three ways. On receipt of an EP pulse, or if a GS or BP pulse is received before MIN OK goes high, FPGA 340 returns to state A to begin timing the next left interval.

If a GS or BP pulse is received after MIN OK goes high, state D is re-entered and a new triple of valid data elements will be sent to FIFO 304. Note that it is not possible to have two BP pulses in a row without an intervening EP, which will send FPGA 340 to state A.

The final path away from state D occurs if interval timer 326 reaches its maximum value of 511 and PFLAG is not set, indicating that the last event received was GS. In that case, FPGA 340 moves to state C to force copying of the triple of valid data elements to FIFO 304.

The major advantages of the present invention over prior art techniques can be summarized as follows.

The invention maximizes the accuracy of energy measurement for any given incident photon rate by making use of more of the available data through the use of filter weighting functions which are asymmetrical in both width and shape and are located on opposite sides of the photon step.

Conversely, improvement in throughput of measured events can be obtained for a given incident photon rate, while minimizing the degradation of energy resolution, also by using asymmetrical filter weighting functions.

Slowly-varying components of the preamplifier output signal which are unrelated to photon events, such as leakage current and microphonics, and which would otherwise limit the effectiveness of asymmetrical weighting functions in accurately measuring the photon energies, are greatly reduced or eliminated.

Pile-up detection is improved over the prior art at all X-ray energies, but is most improved at very low photon energies below 1 KeV. In all previous techniques, a trade-off between minimum detectable energy and timing resolution was necessary. In the present invention, widening the pile-up detecting filter to improve noise suppression and lower the minimum detectable energy does not degrade timing resolution. This is accomplished by using the combined response of two detecting functions, one with a sharp leading edge and one with a sharp trailing edge. The width of the combined response is not dependent on energy, and the timing resolution depends only on the sampling rate of the ADC. The minimum detectable energy is dependent only on the peak-to-peak noise of the preamplifier output signal relative to the height of the photon step. Excellent detection of closely-spaced photons is possible at least down to the carbon K-alpha emission line at 282 eV. The same technique, applied to a faster but noisier data stream generated by a faster but less accurate ADC, still yields better timing resolution vs. photon energy than traditional analog methods for energies above 1 KeV.

Also related to low-energy pile-up detection, the present invention is able to detect the pile-up of two photons whose energies are below the minimum detectable energy of the pile-up detecting filter, or of one such ultra-low energy photon with a photon of higher energy, by observing the effect of such pile-up on the symmetry of the response of an ideal triangular shaping filter.

The invention substantially improves the timing resolution over prior art for close coincidence of two photons below the minimum detectable energy of the pile-up detecting filter, but above half of that energy (for example, the boron K-alpha at 185 eV). The normal response time of the pile-up detecting filter does not vary significantly with energy for single photon events; however, the response time due to the sum of two ultra-low energy photons will be reduced by the separation between them. Such a reduction in response time allows rejection of sum responses, thereby extending the time resolution of the pile-up detecting filter down to nearly half the minimum energy which can be detected directly. Ultra-low energy pile-ups too close to be detected by the asymmetry of the triangle shaper response as described above can be detected using this technique.

As discussed in the Gatti, et al. reference and illustrated in FIG. 1, lengthening shaping times will reach a limit beyond which no further gains in energy resolution can be obtained, due to the influence of parallel and 1/f noise contributions. At low count rates, the present invention improves the energy resolution of spectra beyond what can be achieved with pulse shaping alone, by measuring the local noise level of the preamplifier output signal in the vicinity of the photon event and rejecting photons in excessively noisy regions of the signal or, equivalently, selecting photons whose local noise levels are lower than average.

While the invention has been described with reference to the preferred embodiment thereof, it will be appreciated by those of ordinary skill in the art that various modifications can be made to the method and apparatus disclosed without departing from the spirit and scope of the invention as a whole.

I claim:

1. A pulse pile-up detection apparatus for detecting the close coincidence of step pulses in a stream of data containing noise, said apparatus comprising:
   a storage means to receive said stream of data;
   a leading weighting means for comparing a first short period of said data stream in said storage means with a first longer period of said data stream, said first longer period preceding said first short period;
   a trailing weighting means for comparing a second short period of said data stream in said storage means, said second short period preceding said first short period by at least the rise time of said step pulses, with a second longer period of said data stream, said second longer period following said second short period and extending beyond said first short period;

trigger means for generating a trigger pulse when both the value of said data stream during said first short period differs from the value of said data stream during said first longer period by an amount greater than a threshold, and the value of said data stream during said second short period differs from the value of said data stream during said second longer period, by an amount greater than said threshold;

timing means for measuring the interval between the start of said trigger pulse and the next time when said value of said data stream during said second short period no longer differs from the value of said data stream during said second longer period by said threshold;

pile-up detected output means for generating a pile-up detected signal when said interval exceeds a maximum time determined by the amount by which said second short period precedes said first short period, and by said rise time of said step pulses.

2. The apparatus of claim 1 further comprising:

turnoff timer means connected to said trailing weighting means, to said trigger means, to said timing means, and to said pile-up detected output means for delaying the end of said interval until said value of said data stream during said second short period has not differed from the value of said data stream during said second longer period by said threshold for said turnoff time, said maximum time also being extended by said turnoff time.

3. A noisy-pulse rejection apparatus for rejecting step pulses in a stream of data also containing noise, such apparatus comprising:

a storage means to receive said stream of data;

noise estimating means for estimating the magnitude of the noise in said data stream in the vicinity of said step pulse;

comparator means connected to said noise estimating means for comparing said estimated noise magnitude to a noise limit;

pulse rejection output means connected to said comparator means for generating a pulse-reject signal if said estimated noise magnitude exceeds said noise limit.

4. The apparatus of claim 3 wherein said noise estimating means further comprises:

a delay means for selecting two samples of said data stream separated in time by at least the rise time of said step pulses in said data stream;

subtractor means connected to said delay means for computing the difference of said two samples;

accumulator means connected to said subtractor means for summing said differences of said two samples over period of time;

gating means connected to said subtractor means and said accumulator means for selectively accumulating only such differences which have the opposite sign from the differences which would result from a step pulse.

* * * * *